(12) United States Patent
Kim et al.

(10) Patent No.: US 12,022,550 B2
(45) Date of Patent: Jun. 25, 2024

(54) SMALL DATA TRANSMISSION WITHOUT PATH SWITCH PROCEDURE

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/422,999

(22) PCT Filed: Mar. 12, 2020

(86) PCT No.: PCT/KR2020/003453
§ 371 (c)(1),
(2) Date: Jul. 14, 2021

(87) PCT Pub. No.: WO2020/189958
PCT Pub. Date: Sep. 24, 2020

(65) Prior Publication Data
US 2022/0104299 A1      Mar. 31, 2022

(30) Foreign Application Priority Data
Mar. 15, 2019    (KR) .................. 10-2019-0030123

(51) Int. Cl.
*H04W 76/19* (2018.01)
*H04W 76/22* (2018.01)
*H04W 76/27* (2018.01)

(52) U.S. Cl.
CPC ........... *H04W 76/19* (2018.02); *H04W 76/22* (2018.02); *H04W 76/27* (2018.02)

(58) Field of Classification Search
CPC ............... H04W 76/19; H04W 76/16; H04W 36/00692; H04W 12/037
See application file for complete search history.

(56) References Cited

U.S. PATENT DOCUMENTS

| 2018/0234890 A1* | 8/2018 | Shih ...................... H04W 60/00 |
| 2019/0037635 A1* | 1/2019 | Guo ...................... H04W 76/27 |

(Continued)

FOREIGN PATENT DOCUMENTS

| KR | 10-2017-0134446 A | 12/2017 |
| KR | 10-2018-0093992 A | 8/2018 |

(Continued)

OTHER PUBLICATIONS

3rd Generation Partnership Project; Technical Specification Group Radio Access Network; NG-RAN; Xn application protocol (XnAP) (Release 15), 3GPP TS 38.423 V15.1.0, Sep. 24, 2018 Section 8.2.4.3; and figure 8.2.4.3-1, pp. 1-264.

(Continued)

*Primary Examiner* — Yee F Lam
(74) *Attorney, Agent, or Firm* — BRYAN CAVE LEIGHTON PAISNER LLP

(57) ABSTRACT

A method and apparatus for small data transmission without a path switch procedure in a wireless communication system is provided. A new gNB, which is a radio access network (RAN) node to which a wireless device attempts a connection resume procedure while in an inactive state, receives an anchor kept indication and/or a small data indication from a last serving gNB. The anchor kept indication indicates that the last serving gNB keeps a user equipment (UE) context and/or a UE-associated NG connection with the core network. The small data indication indicates not relocating a UE context from the last serving gNB to the new gNB.

5 Claims, 27 Drawing Sheets

(56) References Cited

U.S. PATENT DOCUMENTS

| | | | | |
|---|---|---|---|---|
| 2020/0022083 A1* | 1/2020 | Jin | ......................... | H04W 76/27 |
| 2020/0029239 A1* | 1/2020 | Chen | ..................... | H04W 76/19 |
| 2020/0037210 A1* | 1/2020 | Rugeland | ............. | H04L 63/123 |
| 2020/0053791 A1* | 2/2020 | Ozturk | .................. | H04W 68/00 |
| 2020/0053818 A1* | 2/2020 | Sillanpaa | .............. | H04W 60/02 |
| 2021/0329723 A1* | 10/2021 | Teyeb | ................. | H04W 12/106 |
| 2022/0007454 A1* | 1/2022 | Han | .................... | H04W 12/106 |
| 2022/0015007 A1* | 1/2022 | Han | ........................ | H04W 8/14 |
| 2022/0061121 A1* | 2/2022 | Han | ....................... | H04W 76/27 |
| 2023/0108725 A1* | 4/2023 | Shi | ........................ | H04W 76/30 |
| | | | | 370/331 |

FOREIGN PATENT DOCUMENTS

| | | | | |
|---|---|---|---|---|
| WO | 2018/086600 A1 | 5/2018 | | |
| WO | WO-2018142207 A1 * | 8/2018 | ............ | H04W 12/08 |
| WO | WO-2018171724 A1 * | 9/2018 | ......... | H04W 52/0225 |
| WO | WO-2020076230 A2 * | 4/2020 | .......... | H04W 12/037 |

OTHER PUBLICATIONS

3rd Generation Partnership Project; Technical Specification Group Radio Access Network; NG-RAN; Architecture description (Release 15), 3GPP TS 38.401 V15.2.0, Jun. 22, 2018 Section 8.6.2; and figure 8.6.2-1, pp. 1-40.

* cited by examiner

SMALL DATA TRANSMISSION WITHOUT PATH SWITCH PROCEDURE

This application is the National Stage filing under 35 U.S.C. 371 of International Application No. PCT/KR2020/003453, filed on Mar. 12, 2020, which claims the benefit of Korean Patent Application No. 10-2019-0030123, filed on Mar. 15, 2019, the contents of which are all hereby incorporated by reference herein in their entirety.

TECHNICAL FIELD

The present disclosure relates to small data transmission without a path switch procedure.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Cellular Internet-of-things (CIoT) is a way of connecting physical things (like sensors) to the internet by having them piggyback on the same mobile networks as smartphones. Its infrastructural simplicity combined with the dawn of 5G positions cellular IoT as a strong player in the connectivity space.

Cellular IoT has been widely adopted across the globe, with 2G and 3G connectivity enabling many early IoT applications. Greater bandwidth, lower latency and increased support for large volumes of devices per cell are coming to the market with 4G offerings. These will be enhanced further with the arrival of 5G networks, initially enabled by the 5G NR standard, which will enable URLLC that support increasingly critical applications.

SUMMARY

One of key issues for CIoT support and evolution for 5G NR is frequency small data transmission. A method for efficiently supporting small data transmission without a path switch procedure during short-term state transition from an inactive state (e.g., RRC_INACTIVE) to a connected state (e.g., RRC_CONNECTED) should be addressed. Furthermore, 5G RAN architecture and/or interface for a wireless device in an inactive state (e.g., RRC_INACTIVE) with small data transmission should also be addressed.

In aspect, a method for a gNB in a wireless communication system is provided. The method includes receiving an anchor kept indication, which indicates that a last serving gNB keeps a user equipment (UE) context and/or a UE-associated NG connection with the core network, from a last serving gNB, transmitting downlink (DL) user plane (UP) transport network layer (TNL) information to the last serving gNB, receiving DL data from a core network via the last serving gNB based on the DL UP TNL information, and forwarding the DL data to the wireless device.

In another aspect, a method for a gNB in a wireless communication system is provided. The method includes receiving a user equipment (UE) Context Retrieve Failure message including a small data indication, which indicates not relocating a UE context from a last serving gNB to the gNB, from the last serving gNB, transmitting downlink (DL) user plane (UP) transport network layer (TNL) information to the last serving gNB, receiving DL data from a core network via the last serving gNB based on the DL UP TNL information, and forwarding the DL data to the wireless device.

The present disclosure can have various advantageous effects.

For example, the last serving NG-RAN can establish data forwarding tunnel towards the new NG-RAN with efficient UE context transfer and skipping the path switch procedure.

For example, the last serving NG-RAN can establish data forwarding tunnel towards the new NG-RAN by reusing the existing Retrieve UE Context procedure with a new indication, e.g., anchor kept indication.

For example, the last serving NG-RAN can establish data forwarding tunnel towards the new NG-RAN by with no context relocation. By using a new indication, e.g., small data indication, the last serving NG-RAN can indicate to the new NG-RAN to skip the path switch procedure towards the core network.

For example, the last serving NG-RAN can establish data forwarding tunnel towards the new NG-RAN without transferring full UE context and triggering the path switch procedure.

For example, RAN-CN signaling can be reduce without impact to the UE.

For example, the last serving NG-RAN can initiate UE context relocation to the new NG-RAN during small data transmission without the path switch procedure due to the AMF-triggered UE-associated signaling. Therefore, unnecessary NG signaling triggered by the AMF can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
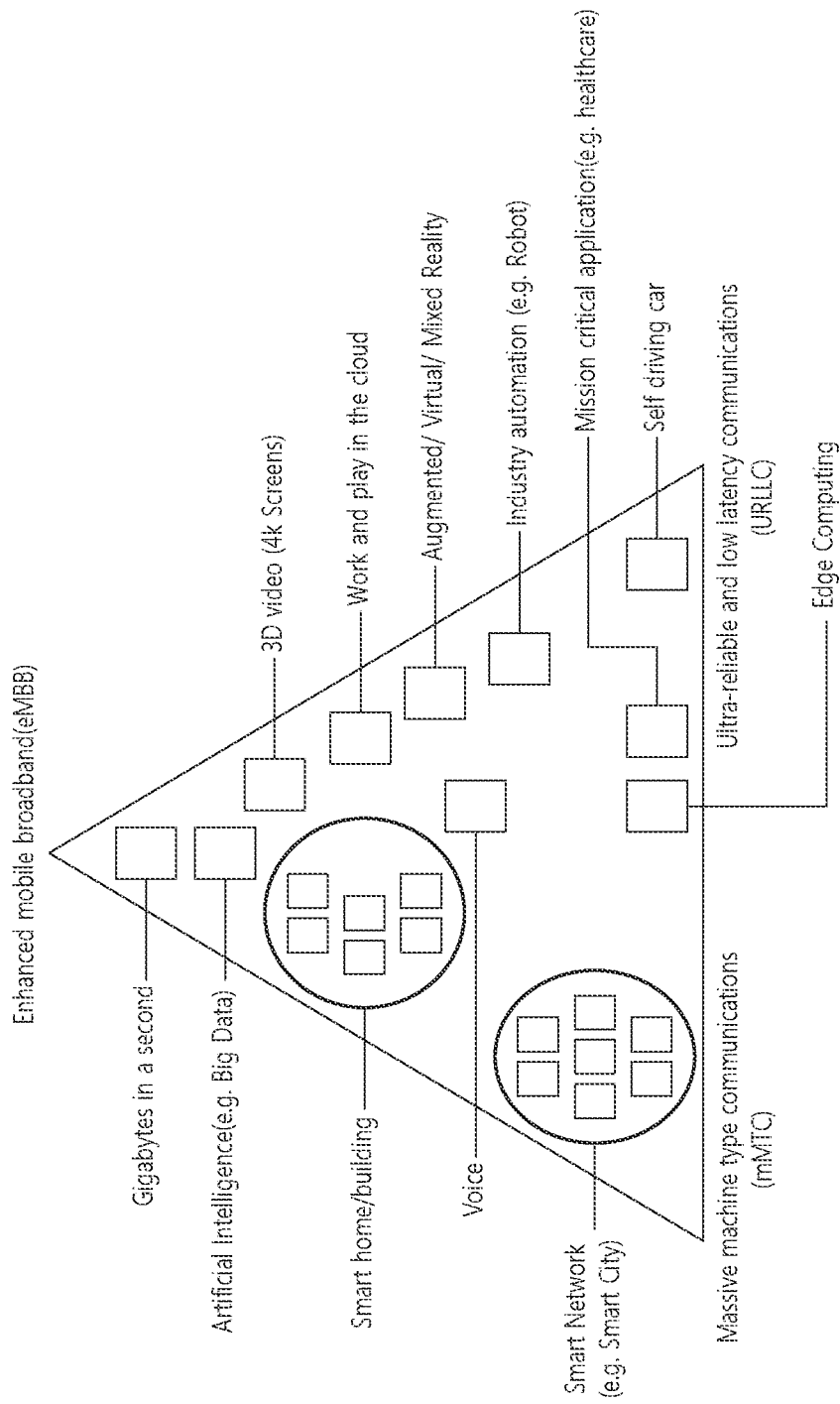
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB)

domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
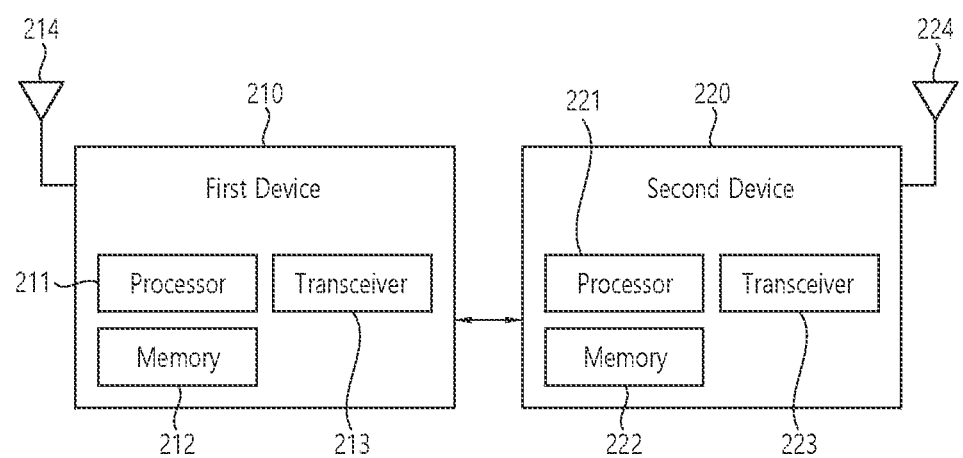
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
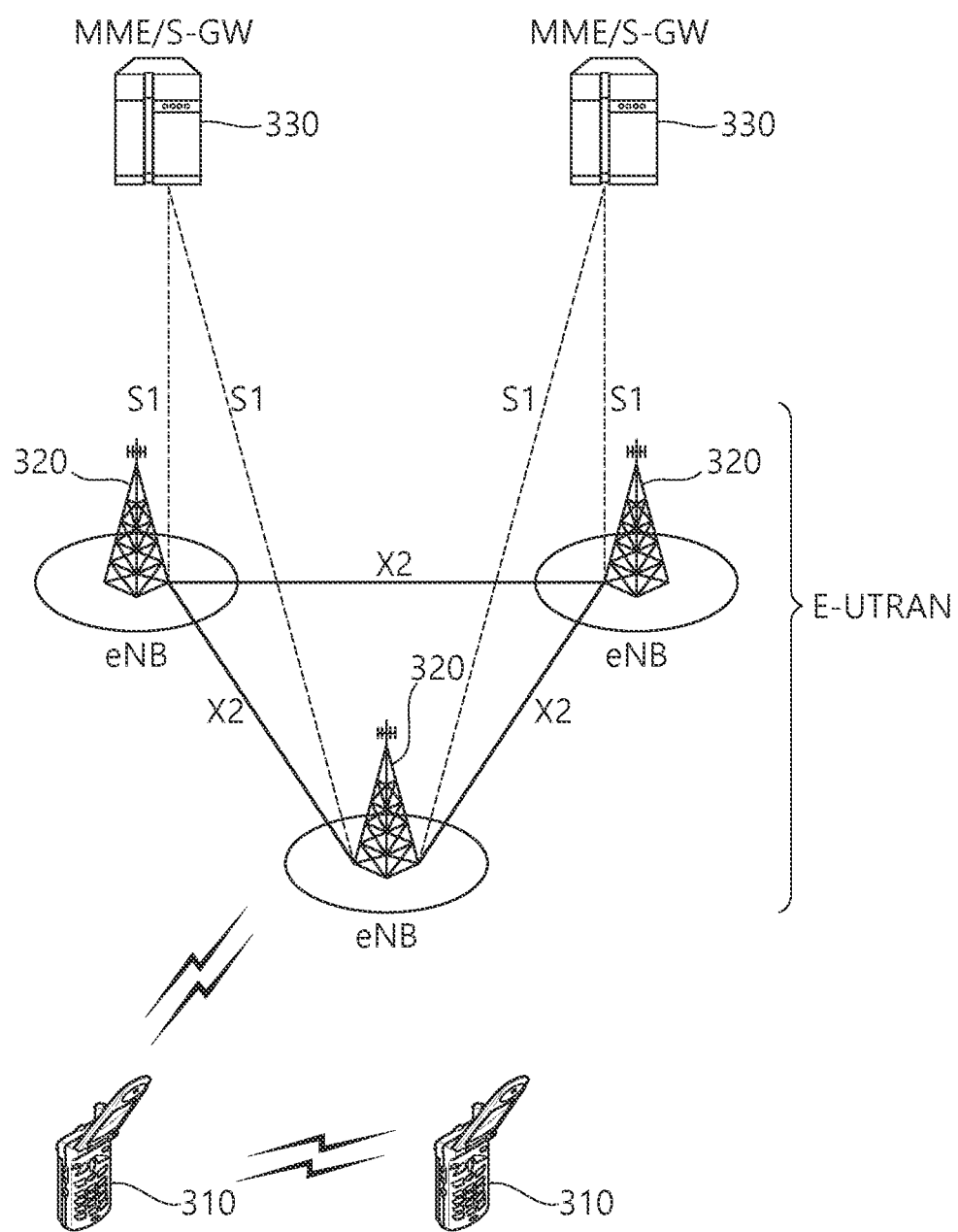
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint.

For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
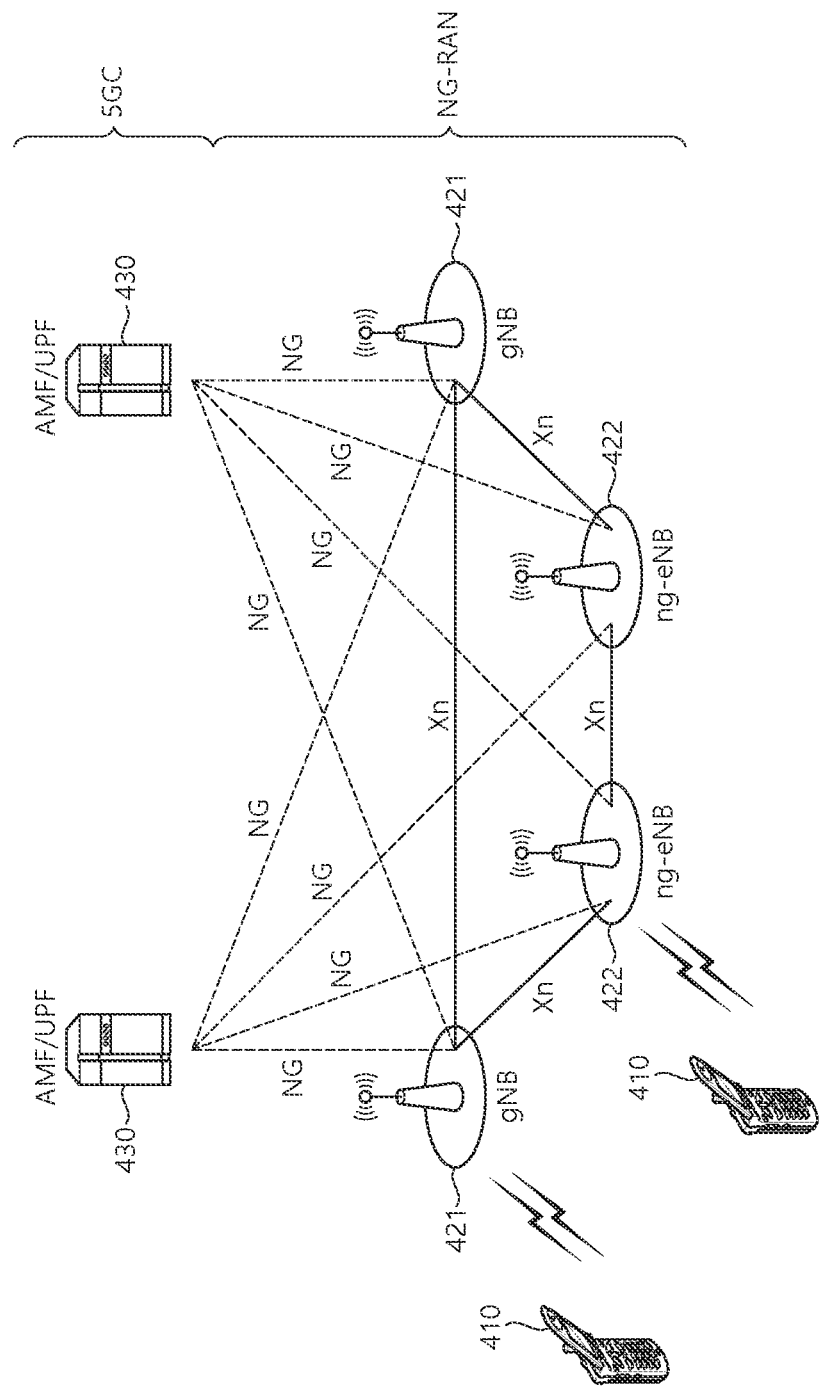
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925

MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 5:
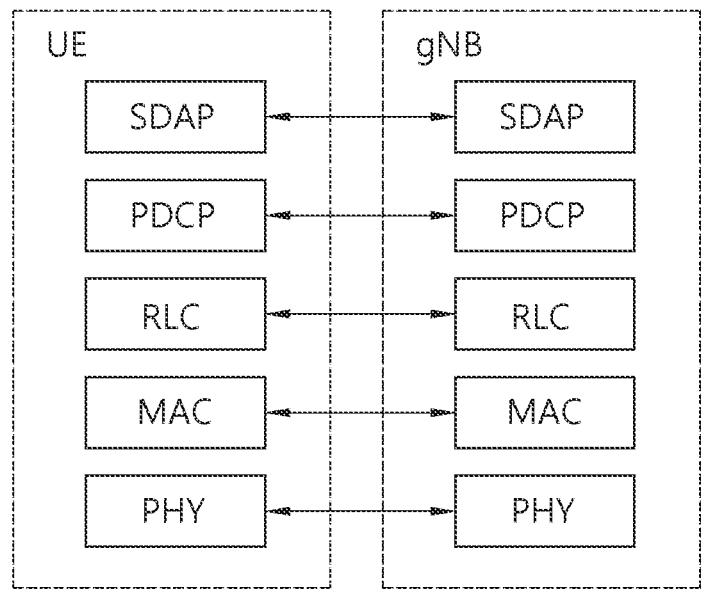
FIG. 5 shows a block diagram of a user plane protocol stack to which the technical features of the present disclosure can be applied.
Figure 6:
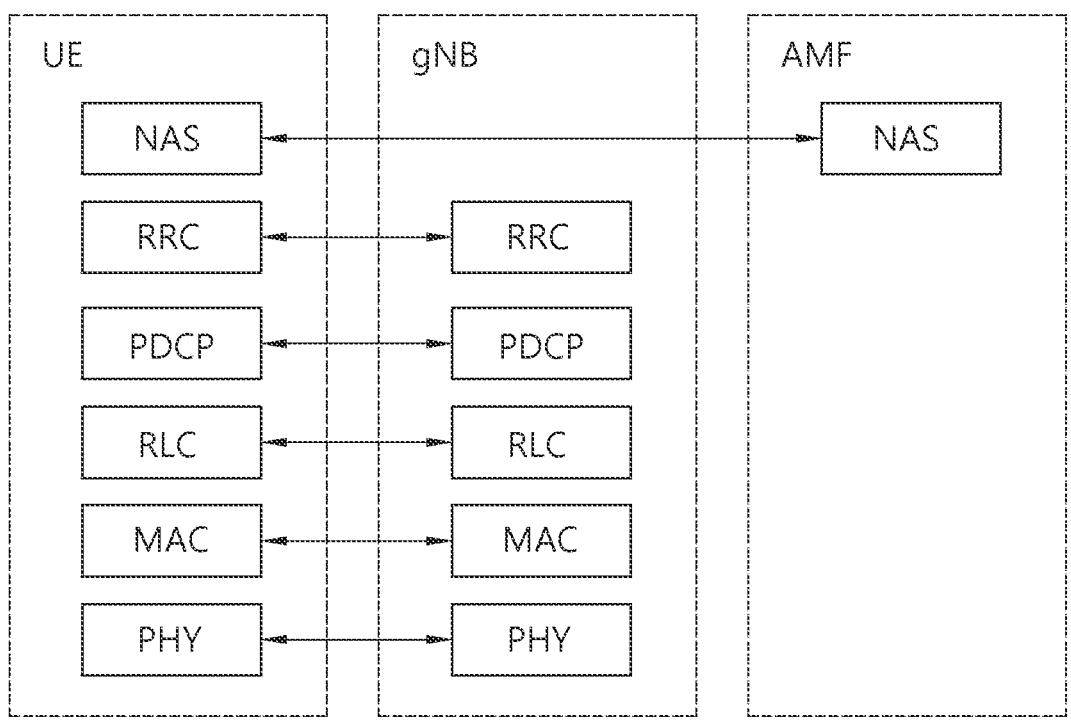
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
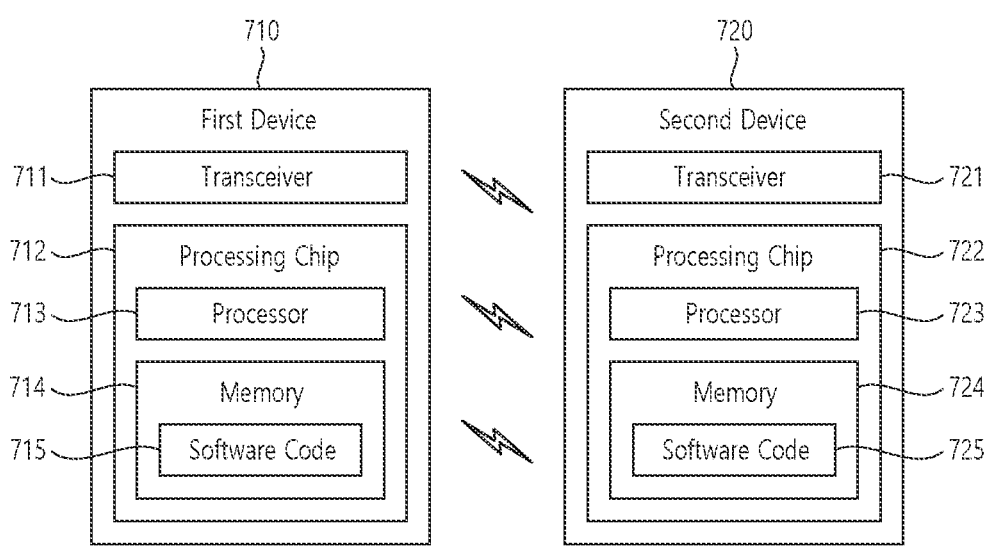
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
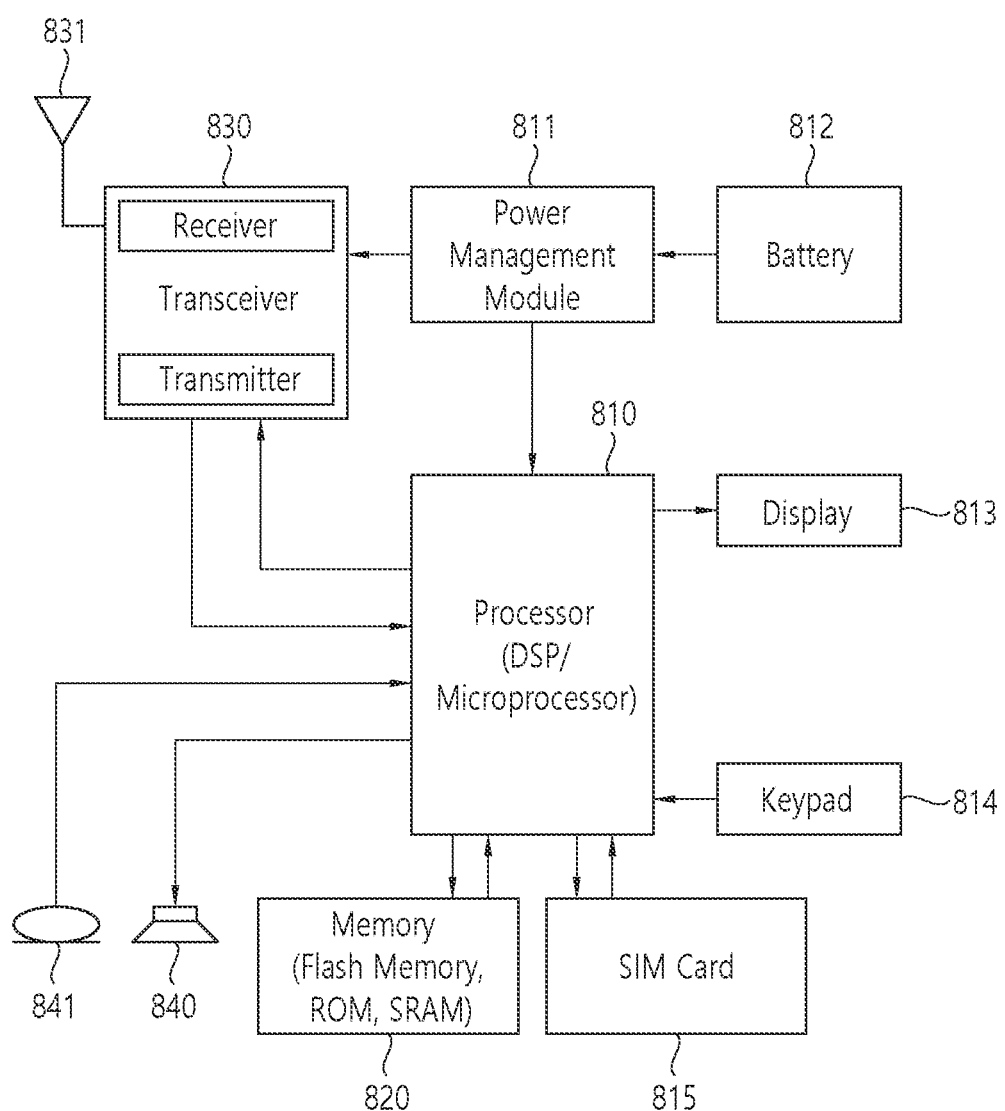
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

Study on cellular IoT (CIoT) support and evolution for 5G system is in progress. One of key issues for the CIoT in 5G system is a frequent small data communication. This key issue aims at providing a solution to support efficient frequent small data transmissions for CIoT, e.g., tracking devices for both mobile originated (MO) and mobile terminated (MT) use cases. It is expected that the number of such devices can increase exponentially, but the data size per device will remain small. Traffic characteristics for UEs used for CIoT using frequent small data transmissions may lead to inefficient use of resources in the 3GPP system and high UE power consumption without use of appropriate optimization.

Frequent small data communication targets optimizations that can meet both architecture requirements on UE power consumption and resource efficient system signaling in a balanced way. A traffic pattern is assumed where small data transmissions may occur from a few small data transmissions per hour to multiple small data transmissions per minute.

As one of solutions of the frequent small data communication for CIoT in 5G system, CM-CONNECTED with RRC inactive state for frequent small data transmission may be introduced. CM-CONNECTED with RRC inactive state is used for frequent small data transmission with following enhancement to avoid frequent N3 tunnel switching for UE with mobility within the RNA, especially for frequent single UL or single UL/DL scenarios:

The SMF sends small data information to the RAN to assist the RAN's decision whether the UE can be sent to RRC inactive state. The small data information may include frequent small data indication, communication pattern, etc. The SMF may retrieve small data information based on network configuration, user subscription, etc.

The UE may send request for small amount of data in RRC resume request.

The RAN may decide not to switching N3 path to serving RAN to avoid unnecessary N2 signaling and UE reconfiguration of RNA due to new anchor RAN node after the path switch.

Additionally, the RAN may remove the PDU session context locally without RAN paging during the CN-initiated deactivation of UP connection for a UE in RRC inactive state for supporting the UP CN-initiated deactivation of UP connection procedure.

How to reduce RAN-CN signaling for UEs in CM-CONNECTED with RRC inactive state when the UEs frequently resume the RRC connection in a new RAN node in the same RNA in order to send/receive small amounts of data only is discussed. For this end, the connection resume procedure may be enhanced. The connection resume procedure is used by the UE to perform state transition from RRC inactive state to RRC connected state. After the connection resume procedure, the UE may deliver small data via resumed user plane.

Figure 9:
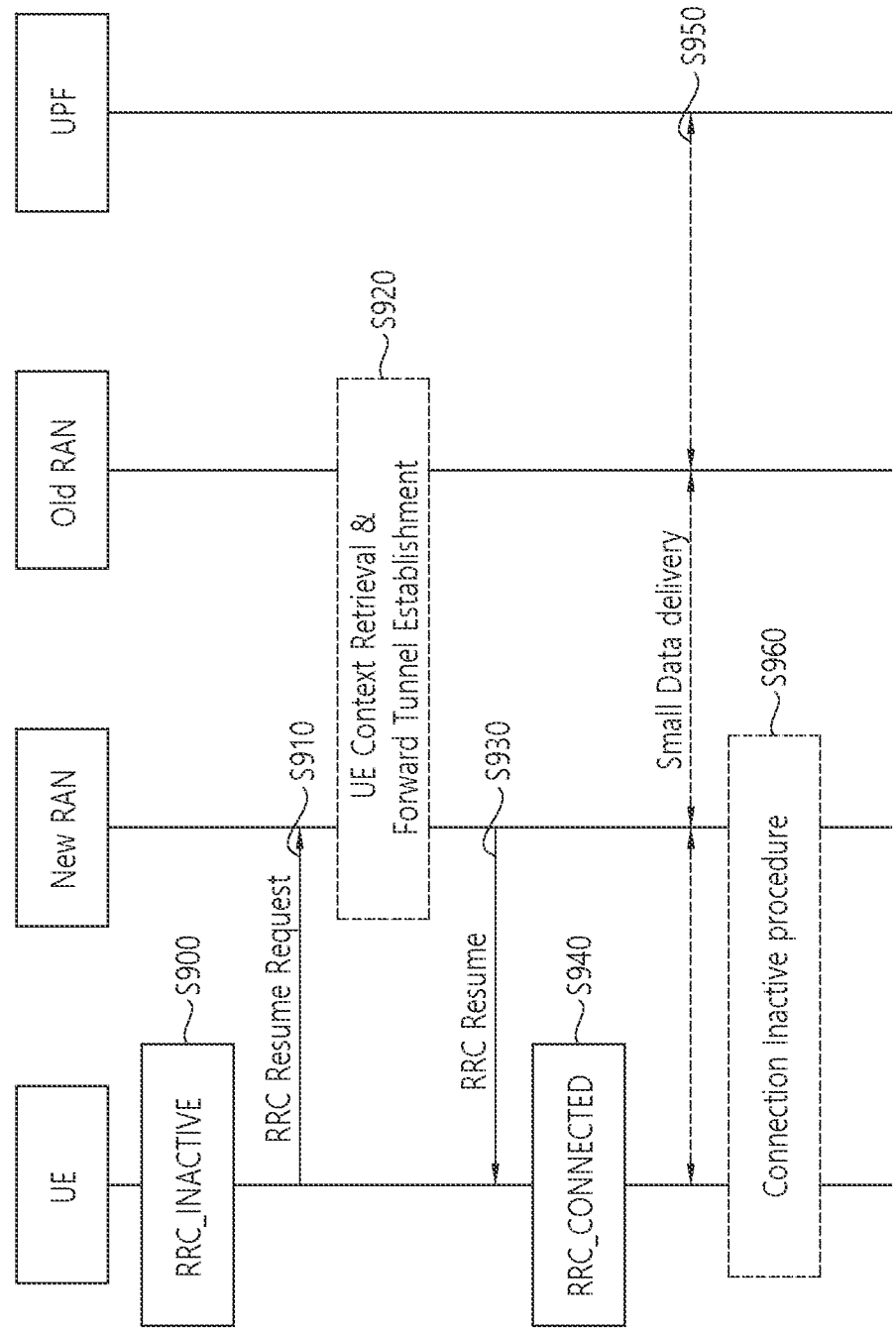
FIG. 9 shows an example of a connection resume procedure for small data transmission to which the technical features of the present disclosure can be applied.

FIG. 9 shows an example of a connection resume procedure for small data transmission to which the technical features of the present disclosure can be applied.

According to the connection resume procedure for small data transmission shown in FIG. 9, the path switch procedure towards the 5GC may be avoided.

In step S900, the UE is in RRC inactive state.

The small data information has been provided to the old RAN node at PDU session establishment as PDU session specific information (called 'SMF assisted NG-RAN information') within the N2 SM information.

In step S910, the UE transmits a RRC Resume Request message to the new RAN node to initiate the transition from RRC inactive state to RRC connected state. The RRC Resume Request message may include a resume ID. The UE may include also request for small amount of data in the RRC Resume Request message.

In step S920, the new RAN node may perform UE context retrieval. The UE context retrieval is performed when the UE context associated with the UE attempting to resume its connection is not locally available at the new RAN node.

The new RAN node, based on the small data information received in the UE context or request for small amount of data received from the UE, may decide to establish a forwarding tunnel between target RAN node and old RAN node, rather than to perform N3 path switch for frequent small data transmission.

The old RAN node keeps the UE context, since the N3 tunnel is not switched to the new RAN node.

In step S930, the new RAN node transmits a RRC Resume message to the UE.

In step S940, the new RAN node confirms to the UE that the UE has entered RRC connected state.

In step S950, the UE delivers small data via user plane.

In step S960, the new RAN node may trigger connection inactive procedure to move the UE to RRC inactive state. The old RAN node will remain as anchor RAN node and the UE will reuse the same resume ID and RNA as before the transitioning to RRC connected state. After this procedure, the new RAN node removes UE context and forwarding tunnel and indicates the old RAN node that the UE enters RRC inactive state.

However, the mechanisms to establish the forwarding tunnel between the old RAN node and the target RAN node has not been defined yet. How to establish the forwarding tunnel between the old RAN node and the target RAN node for small data transmission should be addressed.

More specifically, a connection resume procedure for small data transmission shown in FIG. 9 is avoid the path switch procedure towards the 5GC. To support this functionality, the last serving NG-RAN and new NG-RAN have to establish the forwarding tunnel to deliver the UL/DL small data. Currently, only the data forwarding tunnel from the last serving NG-RAN to the new NG-RAN can be established. Therefore, in order to deliver the UL small data from the UE towards the 5GC via the new NG-RAN, the data forwarding tunnel from the new NG-RAN to the last serving NG-RAN should be established as well.

Furthermore, in order to re-establish the DRB towards the UE in the new NG-RAN, the UE context should be relocated to the new NG-RAN without the path switch procedure. Therefore, both NG-RAN nodes may have duplicated UE context simultaneously. Since each RAN node should use different security key for the UE, it should be decided which NG-RAN node generates the RRC message (e.g., RRC Resume message, RRC Release message).

In addition, when the UE is sent back to the RRC_INACTIVE, the inactive radio network temporary identifier (I-RNTI) should be changed in order to avoid tracking of the UE. Therefore, if the new NG-RAN generates the RRC Release message to push the UE back to the RRC_INACTIVE, the new NG-RAN also allocates a new I-RNTI. However, since the last serving NG-RAN still keeps the UE context and the UE-associated NG connection with the serving AMF and UPF, the last serving NG-RAN may require the new I-RNTI in order to identify the UE in subsequent resumption.

Since the UE is still in the CM_CONNECTED, the AMF may trigger the UE-associated procedure towards the last serving NG-RAN. If the small data transmission without the path switch procedure is in progress, the UE may not be reachable at the last serving NG-RAN directly. Therefore, the last serving NG-RAN may fail the AMF-triggered UE-associated procedure. Upon receiving the failure message from the last serving NG-RAN, the AMF may hold on the UE-associated procedure until the path switch procedure. However, since there is no path switch procedure, it may cause unnecessary behavior at the AMF. To support the AMF-triggered UE-associated procedure during small data transmission without path switch procedure, it may be needed for the last serving NG-RAN to provide the full UE context to the new NG-RAN. Based on this information, the new NG-RAN may be able to trigger the path switch procedure towards the AMF. After that, the AMF can initiate the UE-associated signaling to the new NG-RAN.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Hereinafter, the last serving NG-RAN means a RAN node to which the UE is lastly connected in RRC_CONNECTED before entering RRC_INACTIVE. The new NG-RAN means a RAN node to which the UE attempts a connection resume procedure while in RRC_INACTIVE.

1. Implementation 1

According to the implementation 1 of the present disclosure, the last serving NG-RAN may provide partial UE context to the new NG-RAN to setup the RLC/MAC/PHY configuration of SRB and DRBs in the new NG-RAN. Then, the last serving NG-RAN may generate the RRC message and forward the generated RRC message to the UE via the new NG-RAN.

Figure 10A:
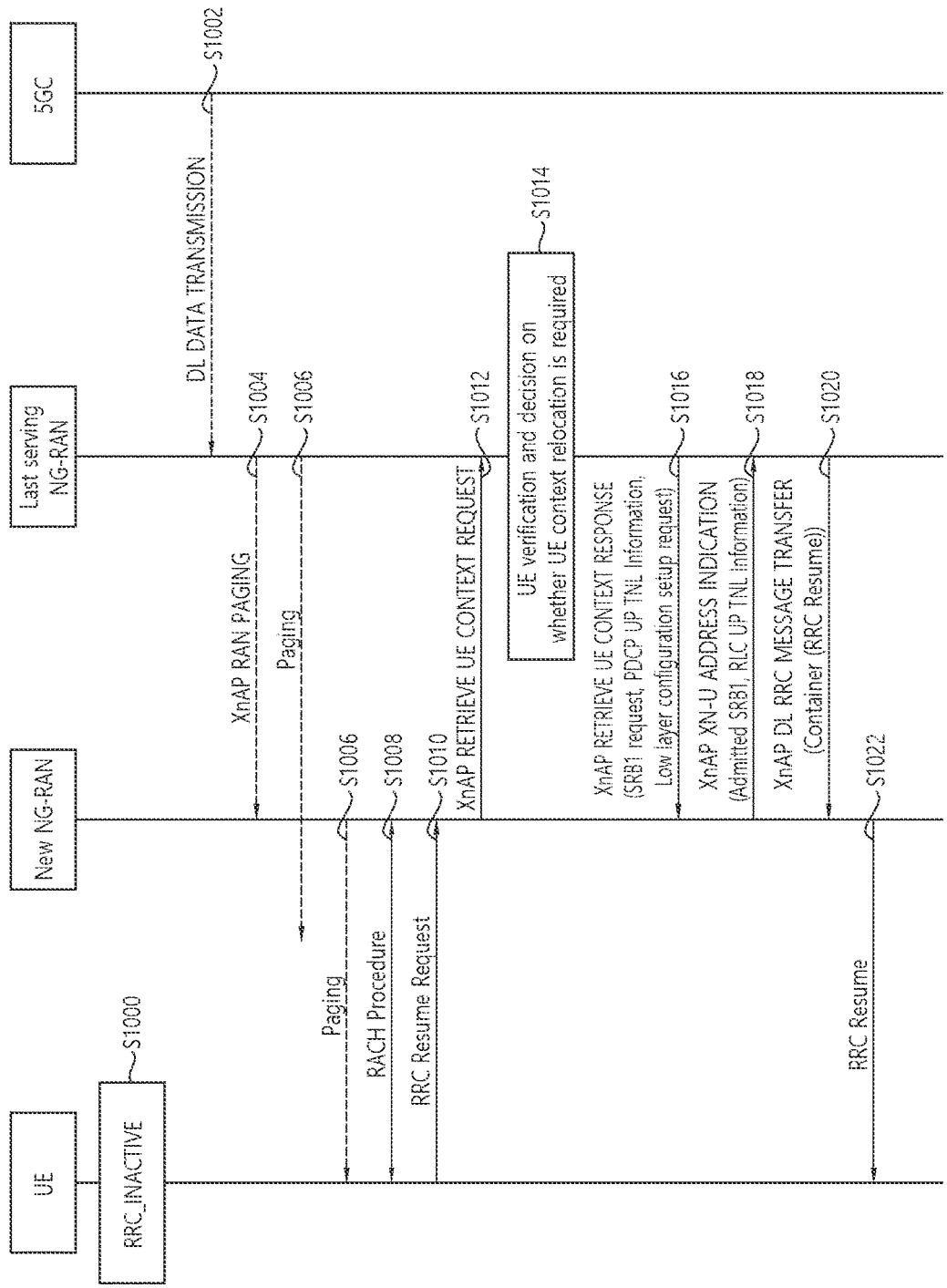
FIG. 10A and FIG. 10B shows an example of a small data transmission procedure with partial UE context relocation to which the technical features of the present disclosure can be applied.
Figure 10B:
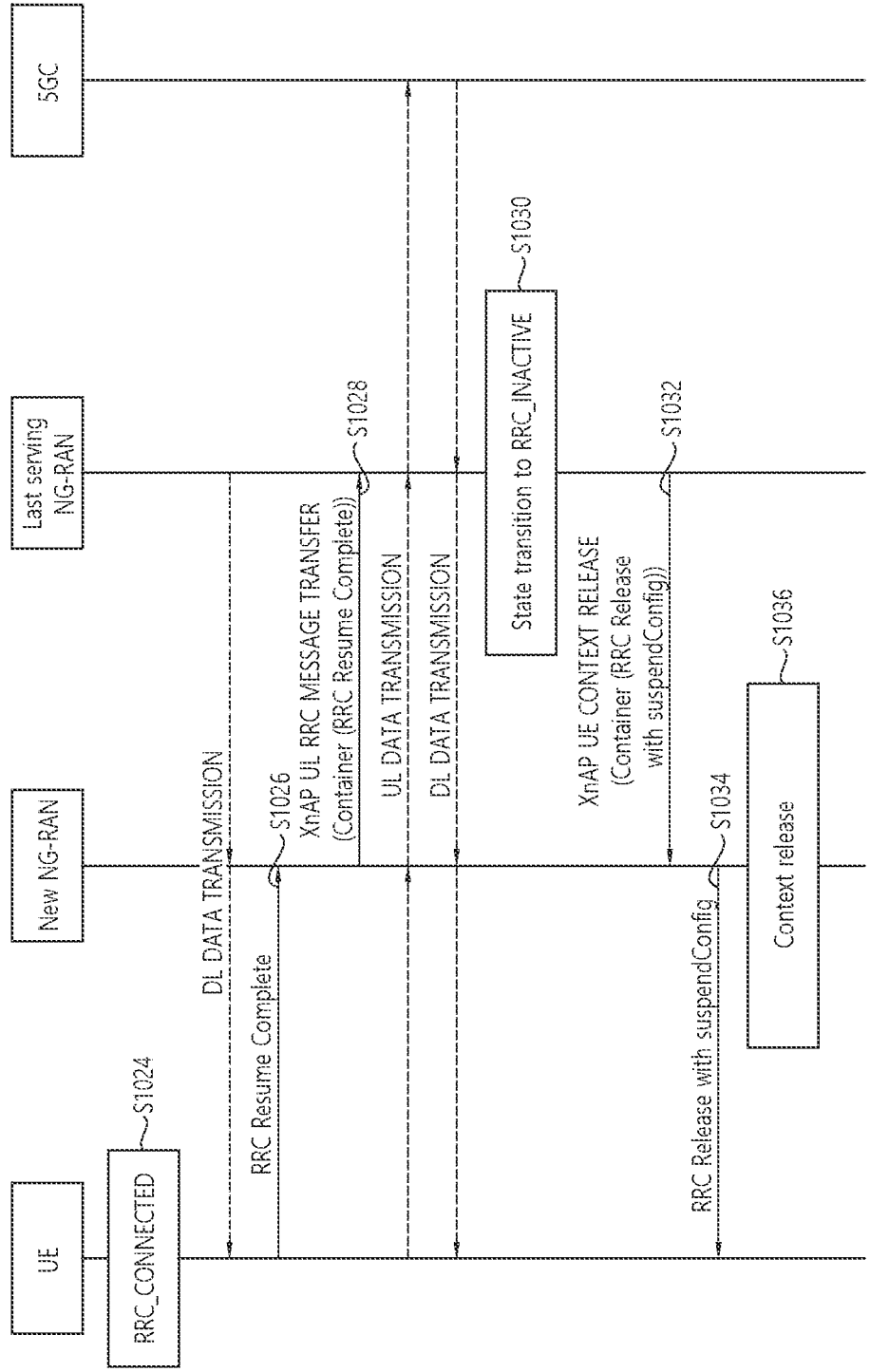

FIG. 10A and FIG. 10B shows an example of a small data transmission procedure with partial UE context relocation to which the technical features of the present disclosure can be applied.

First, FIG. 10A is described.

Step S1000: The UE is in RRC_INACTIVE. The UE and last serving NG-RAN store the UE context, respectively. The NG-C connection between last serving NG-RAN and AMF is maintained. In addition, the NG-U connection between last serving NG-RAN and UPF is maintained.

Step S1002: The last serving NG-RAN may receive DL data on NG-U interface.

Step S1004: The last serving NG-RAN may send the XnAP RAN Paging message to the neighbor NG-RANs in same RNA. For example, the XnAP RAN Paging message may be transmitted to the new NG-RAN.

Step S1006: Each NG-RAN sends Paging message to the UE.

Steps S1002 to S1006 described above may be needed only in case of DL data transmission.

Step S1008: When the UE is being paged and/or when new UL data arrives in the UL buffer, the UE initiates a random access channel (RACH) procedure. In this example, it is assumed that the UE moves into new NG-RAN.

Step S1010: The UE initiates RRC connection resumption by sending an RRC Resume Request message to the new NG-RAN. The RRC Resume Request message may include at least one of I-RNTI for the UE, RRC resume cause, and/or authentication token (e.g., Resume MAC-I). The RRC Resume Request message may be replaced with a new message.

Step S1012: Upon receiving the RRC Resume Request message from the UE, the new NG-RAN first checks whether it is able to find the UE context or not. If not, the new NG-RAN resolves the node identity contained in the I-RNTI, and requests the last serving NG-RAN to provide UE context by initiating the XnAP Retrieve UE Context procedure (e.g., transmitting an XnAP Retrieve UE Context Request message).

Step S1014: The last serving NG-RAN checks whether it is able to find the UE context or not. If yes, the last serving NG-RAN decides whether the UE context relocation to the new NG-RAN is required or not. For the frequent small data transmission (e.g., single PDCP PDUs in uplink and/or single PDCP PDUs in downlink), the last serving NG-RAN decides to keep the UE context and the UE-associated NG connection with the serving AMF and UPF. To setup the user plane path towards the UE without the path switch procedure, the last serving NG-RAN may decide to use PDCP/SDAP of its own while deciding to use RLC/MAC in the new NG-RAN.

Step S1016: If the last serving NG-RAN decides to use RLC/MAC in the new NG-RAN in step S1014, the last serving NG-RAN sends to the new NG-RAN the Retrieve UE Context Response message. The Retrieve UE Context Response message may be replaced with a new message.

The Retrieve UE Context Response message may include low layer configuration setup request to establish a partial UE context at the new NG-RAN, in order to provide radio resources from the new NG-RAN to the UE. The low layer configuration setup request may include at least one of the following information, such as DRB ID, DRB QoS, PDCP sequence number (SN) length, QoS Flows Mapped To DRB List, RLC mode, and CellGroupConfig, which was stored in the last serving NG-RAN when the UE enters RRC_INACTIVE. Based on the information included in the low layer configuration setup request, the new NG-RAN may allocate respective radio resources in RLC/MAC/PHY and respective transport network resources.

The Retrieve UE Context Response message may also include SRB1 request. Based on the SRB1 request, the new NG-RAN may initiate to setup the SRB1 to forward the RRC message generated by the UE and last serving NG-RAN.

The Retrieve UE Context Response message may also include PDCP UP TNL information. The PDCP UP TNL information may be used to indicate to the new NG-RAN the endpoint(s) of a DRB's Xn-U transport bearer for delivery of UL PDUs at the PDCP resource in the last serving NG-RAN.

Step S1018: The new NG-RAN responses to the last serving NG-RAN with the XnAP XN-U Address Indication message. The XnAP XN-U Address Indication message may be replaced with a new message.

The XnAP XN-U Address Indication message may include at least one of RLC/MAC/PHY configuration of SRB and DRBs provided by the new NG-RAN, the admitted SRB1 and/or RLC UP TNL Information. The admitted SRB1 may be used to indicate to the last serving NG-RAN that the SRB1 is successfully setup in the new NG-RAN. The RCL UP TNL information may be used to indicate the GTP-U tunnel endpoint(s) of the DRB's Xn transport at its lower layer resource for delivery of DL PDUs.

Step S1020: After the successful configuration of the low layer in the new NG-RAN, the last serving NG-RAN generates the RRC Resume message to indicate to the UE that the RRC connection is resumed. The RRC Resume message may be replaced with a new message. Then, the last serving NG-RAN sends the XnAP DL RRC Message Transfer message containing the RRC Resume message. The XnAP DL RRC Message Transfer message may be replaced with a new message.

Step S1022: The new NG-RAN sends the RRC Resume message to the UE.

FIG. 10B, which follows FIG. 10A, is described.

Step S1024: The UE is now in RRC_CONNECTED.

If there is pending DL data in the last serving NG-RAN, the DL data may be forwarded to the UE via the new NG-RAN over the Xn interface.

Step S1026: The UE responses with the RRC Resume Complete message to the new NG-RAN. The RRC Resume Complete message may be replaced with a new message.

Step S1028: Upon receiving the RRC Resume Complete message from the UE, the new NG-RAN sends to the last serving NG-RAN the XnAP UL RRC Message Transfer message containing the RRC Resume Complete message. The XnAP UL RRC Message Transfer message may be replaced with a new message. Based on the RRC Resume Complete message, the last serving NG-RAN can be aware of successful state transition to RRC_CONNECTED for the UE. The UL/DL data may be forwarded via the new NG-RAN and last serving NG-RAN.

Step S1030: Based on an expiry of the local timer in the last serving NG-RAN, the AS Release Assistance Indication from the UE, or other reasons (e.g., end marker from the UE and/or 5GC), the last serving NG-RAN may decide to transit the UE from RRC_CONNECTED to RRC_INACTIVE.

Step S1032: To make the UE enter RRC_INACTIVE again, the last serving NG-RAN generates the RRC Release message with suspendConfig. By using the RRC Release message with suspendConfig, the last serving NG-RAN may allocate update information, such as a new I-RNTI, RNA, and/or {NCC, NH} pair, to the UE.

Then, the last serving NG-RAN sends the XnAP UE Context Release message containing the RRC Release message with suspendConfig. The XnAP UE Context Release message may be replaced with a new message.

Alternatively, the last serving NG-RAN may send the XnAP UE Context Release Required message including the RRC Release message with suspendConfig to check whether there is the remaining UL data from the UE in the new NG-RAN. The XnAP UE Context Release Required message may be replaced with a new message.

Step S1034: Upon receiving the XnAP UE Context Release message containing the RRC Release message with suspendConfig, the new NG-RAN transparently forwards the RRC Release message with suspendConfig to the UE.

If the XnAP UE Context Release Required message is received and there is no remaining UL data, the new NG-RAN may transparently forward the RRC Release message with suspendConfig to the UE and respond to the last serving NG-RAN with the XnAP UE Context Release Confirm message. If the XnAP UE Context Release Required message is received and there is remaining UL data, the new NG-RAN responses to the last serving NG-RAN with the XnAP UE Context Release Reject message with a new cause value to inform there is remaining UL data from the UE.

Step S1036: The new NG-RAN releases radio and control plane related resources associated to the UE context.

According to the embodiment 1 of the present disclosure shown in FIG. 10, the last serving NG-RAN can establish data forwarding tunnel towards the new NG-RAN without transferring full UE context and triggering the path switch procedure. In addition, the last serving NG-RAN can generate RRC message and forward the generated RRC message to the UE via the new NG-RAN without security impact. Therefore, RAN-CN signaling can be reduced without impact to the UE.

2. Implementation 2

According to the implementation 2 of the present disclosure, the last serving NG-RAN may provide full UE context to the new NG-RAN to setup data forwarding tunnel between the last serving NG-RAN and the new NG-RAN. The anchor kept indication may also be provided to the new NG-RAN not to trigger the path switch procedure towards the 5GC. The RRC message (e.g., RRC Resume message, RRC Release message with suspendConfig) may be generated by the new NG-RAN. However, the UE context updated by the new NG-RAN may also be transferred to the last serving NG-RAN for subsequent resumption of the UE.

Figure 11:
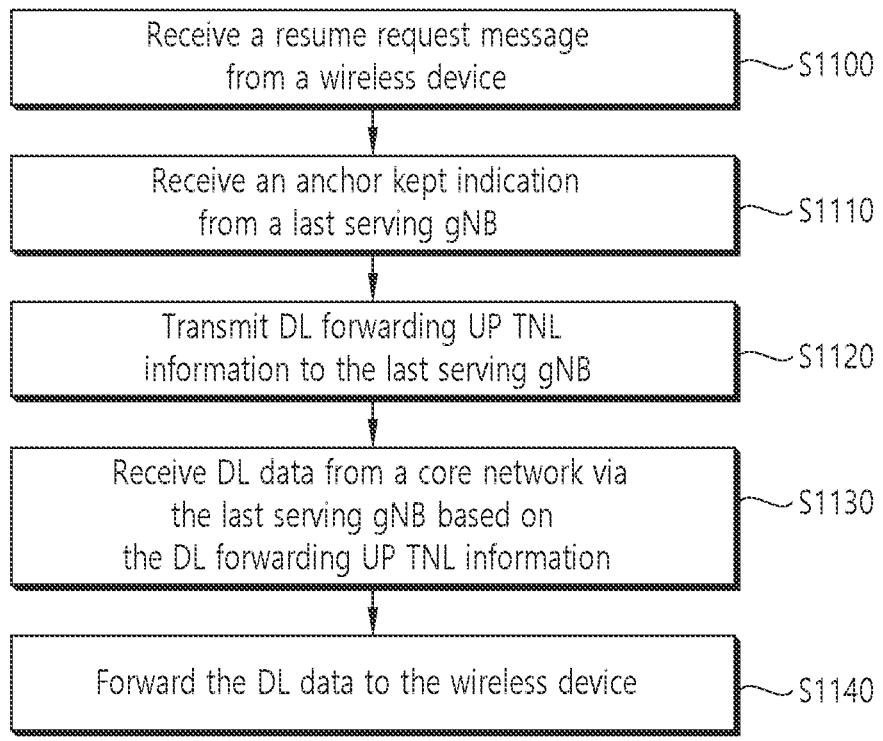
FIG. 11 shows an example of a method for a gNB to which the technical features of the present disclosure can be applied.

FIG. 11 shows an example of a method for a gNB to which the technical features of the present disclosure can be applied.

In step S1100, the gNB receives a resume request message from the wireless device. That is, the gNB may be a new gNB to which the wireless device attempts connection resume procedure while in RRC_INACTIVE.

The gNB may transmit the XnAP Retrieve UE Context Request message to the last serving gNB. Upon receiving the XnAP Retrieve UE Context Request message, the last serving gNB may check whether it is able to find the UE context or not. If yes, then the last serving gNB may decide whether the UE context relocation to the new NG-RAN is required or not. For the frequent small data transmission (e.g., single PDCP PDUs in uplink and/or single PDCP PDUs in downlink), the last serving NG-RAN may decide to keep the UE context and the UE-associated NG connection with the serving AMF and UPF.

In step S1110, the gNB receives an anchor kept indication from the last serving gNB. The anchor kept indication indicates that the last serving gNB keeps UE context and/or UE-associated NG connection with the core network.

In some implementations, a path switch procedure towards the core network may be skipped based on the anchor kept indication.

In some implementations, the anchor kept indication may be received via an XnAP Retrieve UE Context Response message including the UE context.

In some implementations, the XnAP Retrieve UE Context Response message may include UL UP TNL information for setting up a forwarding tunnel for UL data from the wireless device. The gNB may receive the UL data from the wireless device, and forward the UL data towards the core network via the last serving gNB based on the UL UP TNL information, e.g., on the forwarding tunnel which is set up according to the UL UP TNL information.

In step S1120, the gNB transmits DL UP TNL information to the last serving gNB.

In step S1130, the gNB receives DL data from the core network via the last serving gNB based on the DL UP TNL information, e.g., on the forwarding tunnel which is set up according to the DL UP TNL information.

In step S1140, the gNB forwards the DL data to the wireless device.

In some implementations, the gNB may transmit an XnAP UE Context Release Request message including an updated UE context to the last serving gNB, e.g., upon deciding to transit the UE from RRC_CONNECTED to RRC_INACTIVE.

In some implementations, before transmitting the XnAP UE Context Release Request message, the gNB may generate RRC Release message with a suspend configuration, and transmit the RRC Release message with the suspend configuration to the wireless device. That is, the RRC Release message with the suspend configuration may be generated by the gNB.

In some implementations, the gNB may receive an XnAP UE Context Release message including an RRC Release message with a suspend configuration from the last serving gNB, in response to the XnAP UE Context Release Request message, and transmit the RRC Release message with the suspend configuration to the wireless device. That is, the RRC Release message with the suspend configuration may be generated by the last serving gNB.

In some implementations, the wireless device is in communication with at least one of a mobile device, a network, and/or autonomous vehicles other than the wireless device.

Figure 12A:
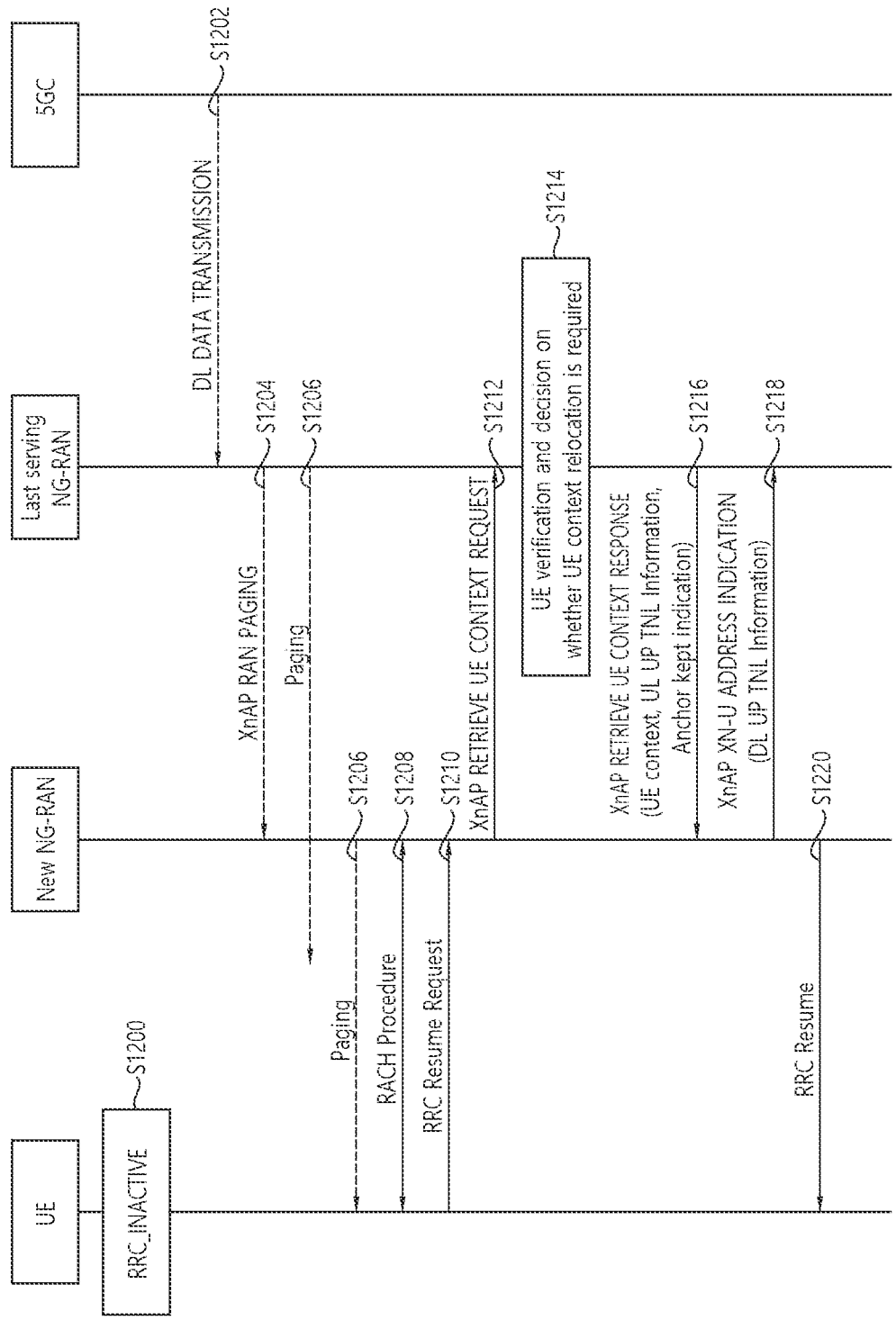
FIG. 12A and FIG. 12B shows an example of a small data transmission procedure with duplicated UE context to which the technical features of the present disclosure can be applied.
Figure 12B:
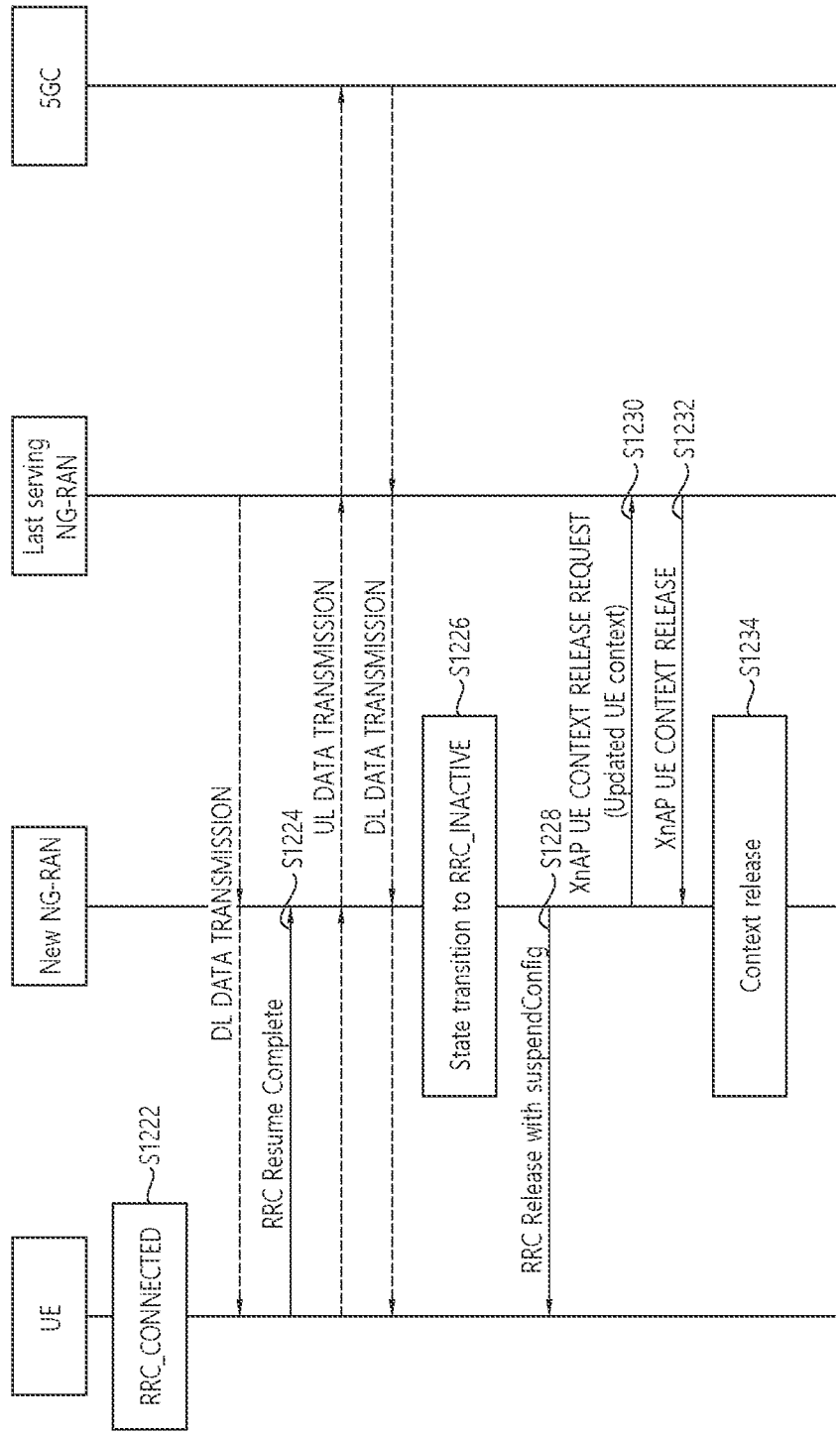

FIG. 12A and FIG. 12B shows an example of a small data transmission procedure with duplicated UE context to which the technical features of the present disclosure can be applied.

In this example shown in FIG. 12A and FIG. 12B, the new NG-RAN generates RRC Release message with suspend-Config.

First, FIG. 12A is described.

Step S1200: The UE is in RRC_INACTIVE. The UE and last serving NG-RAN store the UE context, respectively. The NG-C connection between last serving NG-RAN and AMF is maintained. In addition, the NG-U connection between last serving NG-RAN and UPF is maintained.

Step S1202: The last serving NG-RAN may receive DL data on NG-U interface.

Step S1204: The last serving NG-RAN may send the XnAP RAN Paging message to the neighbor NG-RANs in same RNA. For example, the XnAP RAN Paging message may be transmitted to the new NG-RAN.

Step S1206: Each NG-RAN sends Paging message to the UE.

Steps S1202 to S1206 described above may be needed only in case of DL data transmission.

Step S1208: When the UE is being paged and/or when new UL data arrives in the UL buffer, the UE initiates a RACH procedure. In this example, it is assumed that the UE moves into new NG-RAN.

Step S1210: The UE initiates RRC connection resumption by sending an RRC Resume Request message to the new NG-RAN. The RRC Resume Request message may include at least one of I-RNTI for the UE, RRC resume cause, and/or authentication token (e.g., Resume MAC-I). The RRC Resume Request message may be replaced with a new message.

Step S1212: Upon receiving the RRC Resume Request message from the UE, the new NG-RAN first checks whether it is able to find the UE context or not. If not, the new NG-RAN resolves the node identity contained in the I-RNTI, and requests the last serving NG-RAN to provide UE context by initiating the XnAP Retrieve UE Context procedure (e.g., transmitting an XnAP Retrieve UE Context Request message).

Step S1214: The last serving NG-RAN checks whether it is able to find the UE context or not. If yes, the last serving NG-RAN decides whether the UE context relocation to the new NG-RAN is required or not. For the frequent small data transmission (e.g., single PDCP PDUs in uplink and/or single PDCP PDUs in downlink), the last serving NG-RAN decides to keep the UE context and the UE-associated NG connection with the serving AMF and UPF.

Step S1216: To setup user plane path towards the UE without the path switch procedure, the last serving NG-RAN transmits the XnAP Retrieve UE Context Response message to the new NG-RAN. The XnAP Retrieve UE Context Response message includes UE context and an anchor kept indication.

The last serving NG-RAN may indicate to the new NG-RAN that the last serving NG-RAN keeps the UE context and/or the UE-associated NG connection with the serving AMF and UPF via the anchor kept indication. Therefore, the new NG-RAN may be informed of resuming the RRC connection to the UE and skipping the path switch procedure towards the core network.

The XnAP Retrieve UE Context Response message may also include UL UP TNL information. The UL UP TNL information may be used to setup forwarding tunnel for the UL data from the UE over the Xn interface.

Step S1218: The new NG-RAN responses to the last serving NG-RAN with the XnAP XN-U Address Indication message including DL UP TNL information for the DL data forwarding from the last serving NG-RAN. The XnAP XN-U Address Indication message may be replaced with a new message.

Step S1220: Based on the UE context received in step S1216, the new NG-RAN sends the RRC Resume message to the UE. The RRC Resume message may be replaced with a new message.

FIG. 12B, which follows FIG. 12A, is described.

Step S1222: The UE is now in RRC_CONNECTED.

If there is pending DL data in the last serving NG-RAN, the DL data may be forwarded to the UE via the new NG-RAN over the Xn interface.

Step S1224: The UE responses with the RRC Resume Complete message to the new NG-RAN. The RRC Resume Complete message may be replaced with a new message. Based on the RRC Resume Complete message, the new NG-RAN can be aware of successful state transition to RRC_CONNECTED for the UE. The UL/DL data may be forwarded via the new NG-RAN and last serving NG-RAN.

Step S1226: Based on an expiry of the local timer in the new NG-RAN, the AS Release Assistance Indication from the UE, or other reasons (e.g., end marker from the UE and/or 5GC), the new NG-RAN may decide to transit the UE from RRC_CONNECTED to RRC_INACTIVE.

Step S1228: To make the UE enter RRC_INACTIVE again, the new NG-RAN generates the RRC Release message with suspendConfig. By using the RRC Release message with suspendConfig, the new NG-RAN may allocate update information, such as a new I-RNTI, RNA, AS key $K_{RRCint}$ and/or {NCC, NH} pair, to the UE. Then, the new NG-RAN sends the RRC Release message with suspendConfig to the UE.

Step S1230: The new NG-RAN sends the XnAP UE Context Release Request message to the last serving NG-RAN. The XnAP UE Context Release Request message may be replaced with a new message.

The XnAP UE Context Release Request message includes the UE context with the update information newly allocated to the UE by the new NG-RAN. Upon receiving the XnAP UE Context Release Request message from the new NG-RAN, the last serving NG-RAN stores the updated UE context for subsequent resumption for the UE.

Step S1232: The last serving NG-RAN responses with the XnAP UE Context Release message to the new NG-RAN. The XnAP UE Context Release message may be replaced with a new message.

Step S1234: The new NG-RAN releases radio and control plane related resources associated to the UE context.

Figure 13A:
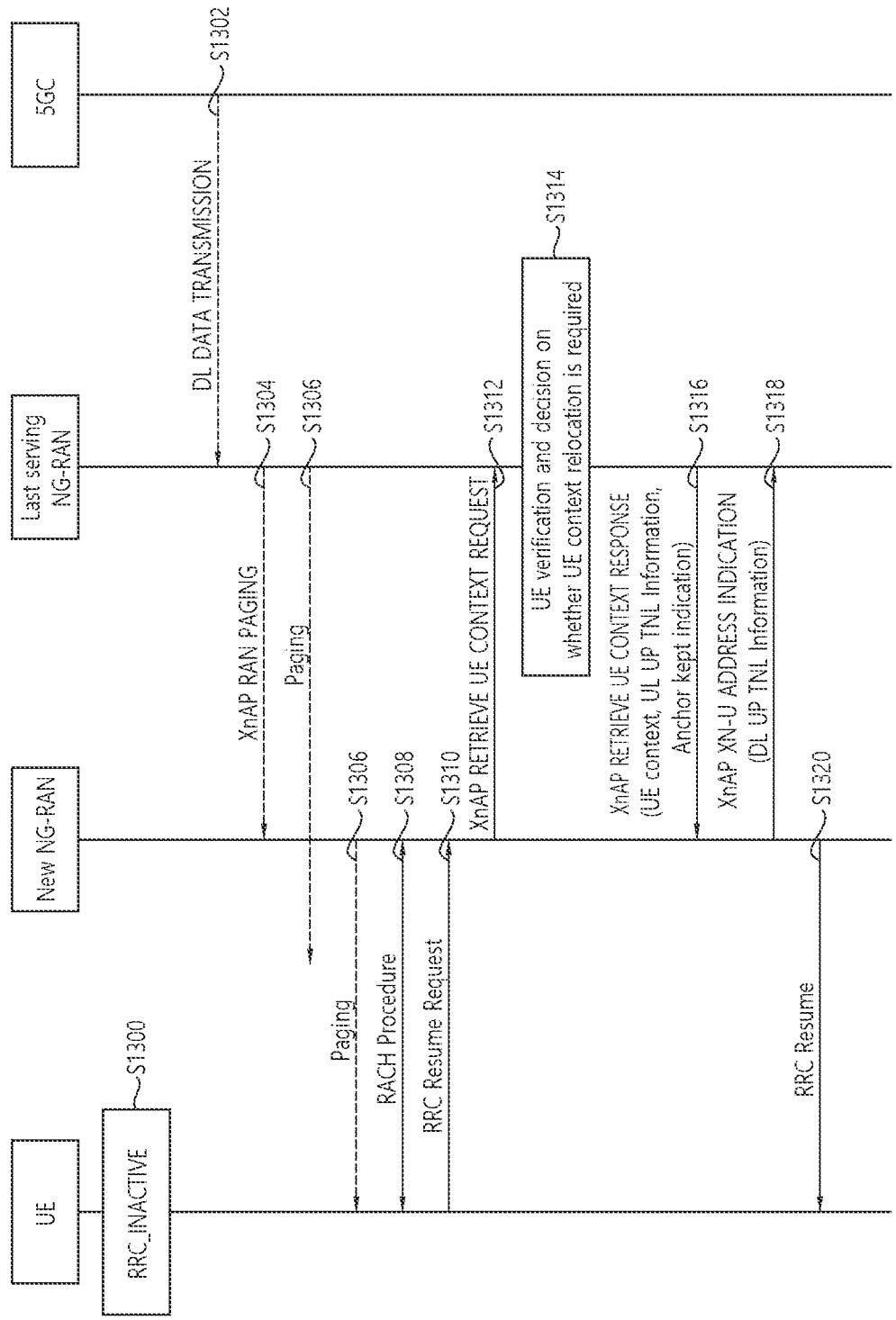
FIG. 13A and FIG. 13B shows another example of a small data transmission procedure with duplicated UE context to which the technical features of the present disclosure can be applied.
Figure 13B:
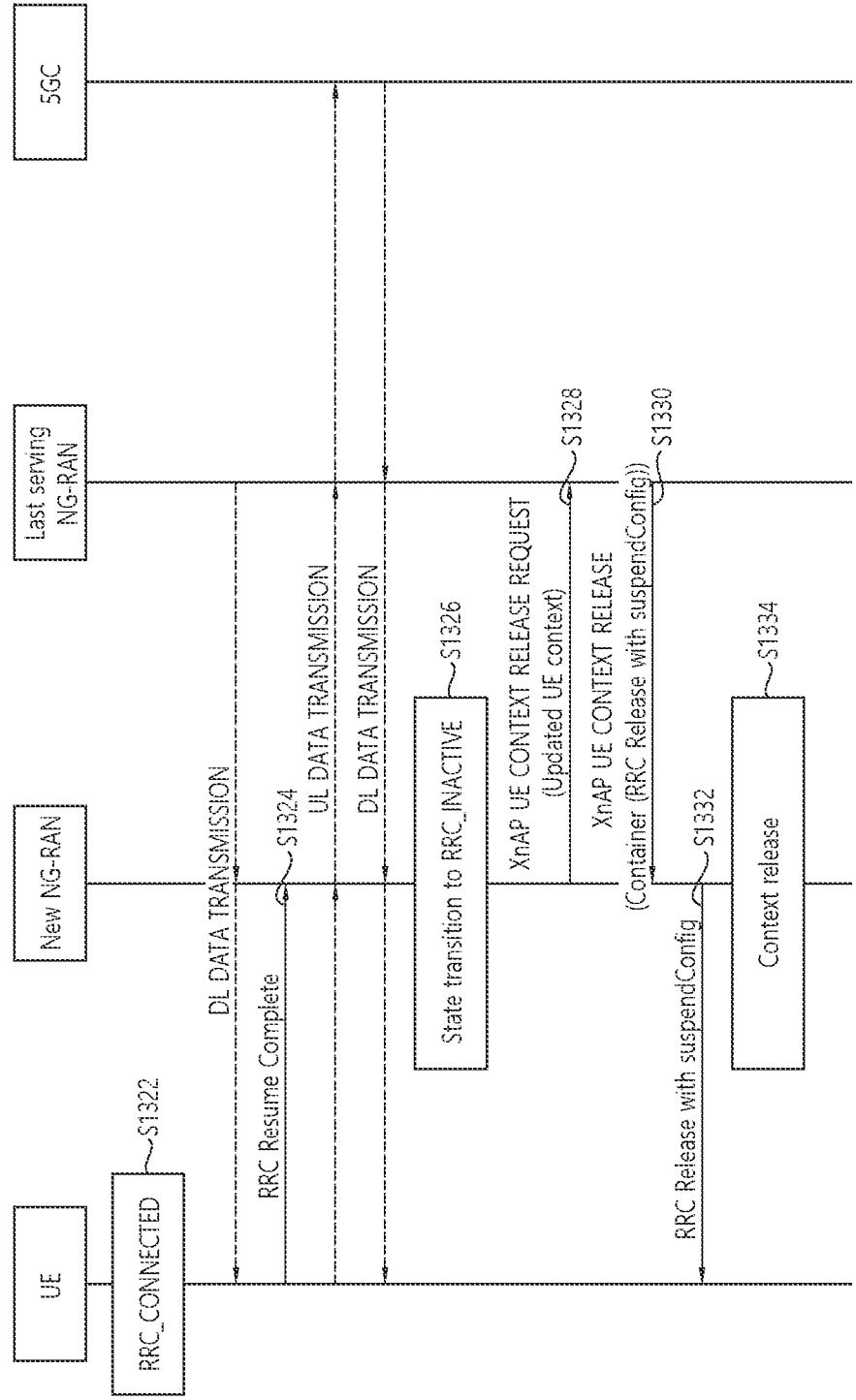

FIG. 13A and FIG. 13B shows another example of a small data transmission procedure with duplicated UE context to which the technical features of the present disclosure can be applied.

In this example shown in FIG. 13A and FIG. 13B, the last serving NG-RAN generates RRC Release message with suspendConfig.

First, FIG. 13A is described.

Each of steps S1300 to S1320 shown in FIG. 13A corresponds to each of steps S1200 to S1220 shown in FIG. 12A.

FIG. 13B, which follows FIG. 13A, is described.

Each of steps S1322 to S1326 shown in FIG. 13A corresponds to each of steps S1222 to S1226 shown in FIG. 12A.

Step S1328: The new NG-RAN sends the XnAP UE Context Release Request message to the last serving NG-RAN. The XnAP UE Context Release Request message may be replaced with a new message.

The XnAP UE Context Release Request message includes the UE context with the update information newly allocated to the UE by the new NG-RAN. Upon receiving the XnAP UE Context Release Request message from the new NG-RAN, the last serving NG-RAN generates the RRC Release message with suspendConfig. By using the RRC Release message with suspendConfig, the last serving NG-RAN may allocate update information, such as a new I-RNTI, RNA, AS key $K_{RRCint}$ and/or {NCC, NH} pair, to the UE.

Step S1330: The last serving NG-RAN responses with the XnAP UE Context Release message containing the RRC Release message with suspendConfig to the new NG-RAN. The XnAP UE Context Release message may be replaced with a new message.

Step S1332: Then, the new NG-RAN transparently forwards the RRC Release message with suspendConfig to the UE.

Step S1334: The new NG-RAN releases radio and control plane related resources associated to the UE context.

According to the embodiment 2 of the present disclosure shown in FIG. 11, FIG. 12A, FIG. 12B, FIG. 13A and FIG. 13B, the last serving NG-RAN can establish data forwarding tunnel towards the new NG-RAN by reusing the existing Retrieve UE Context procedure with a new indication, e.g., anchor kept indication. For example, the last serving NG-RAN can establish data forwarding tunnel towards the new NG-RAN. In addition, the new NG-RAN can generate the RRC message, and report the updated UE context to the last serving NG-RAN. Therefore, RAN-CN signaling can be reduced without impact to the UE.

3. Implementation 3

According to the implementation 3 of the present disclosure, the last serving NG-RAN may not provide to the new NG-RAN the UE context to setup data forwarding tunnel between the last serving NG-RAN and the new NG-RAN. The last serving NG-RAN may just provide UP TNL information for forwarding the UL data from the UE. A new indication may also be provided to inform the new NG-RAN of not relocating the UE context and skipping the path switch procedure.

According to the implementation 3 of the present disclosure, the last serving NG-RAN may provide UP TNL information for forwarding the UL data from the UE by using the XnAP RAN Paging message. Upon receiving the UP TNL information in the RAN PAGING message, the new NG-RAN may also be able to response with UP TNL information for forwarding the DL data from the 5GC in the Retrieve UE Context Request message.

Figure 14:
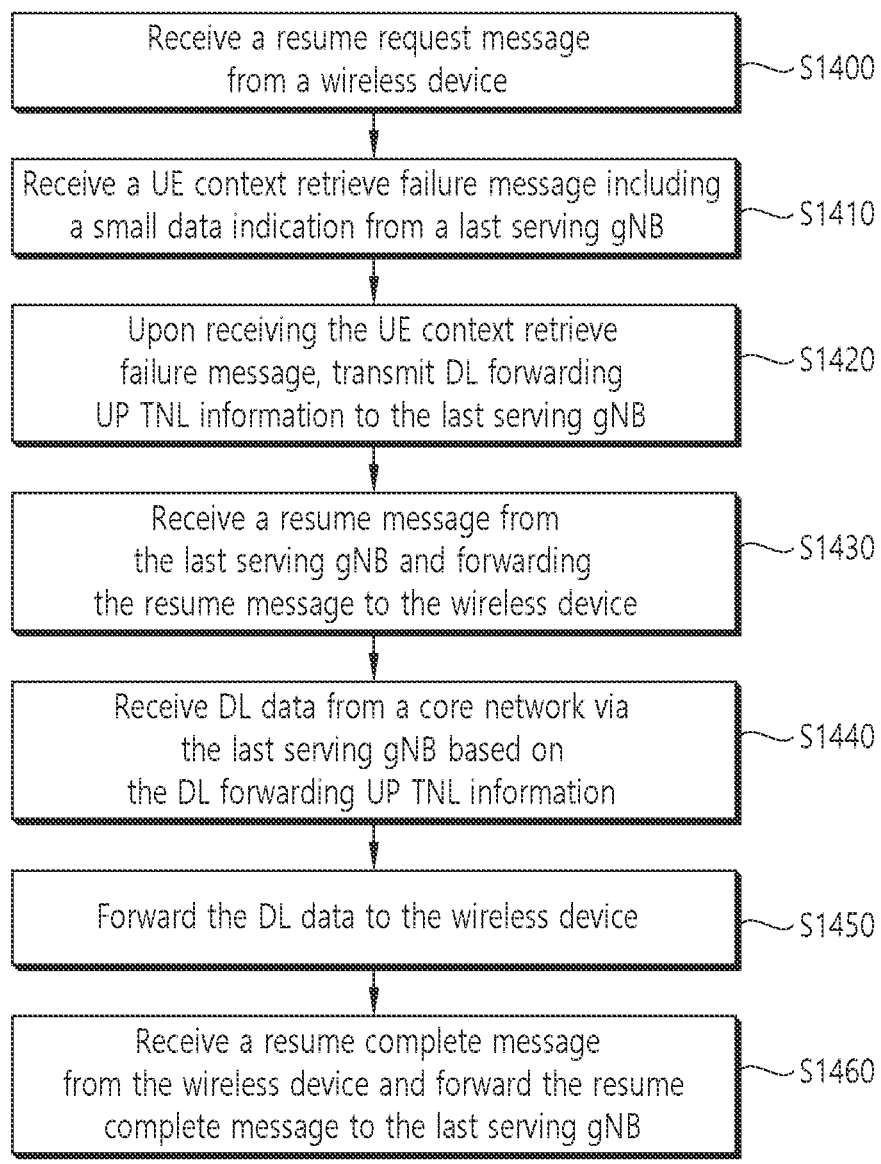
FIG. 14 shows another example of a method for a gNB to which the technical features of the present disclosure can be applied.

FIG. 14 shows another example of a method for a gNB to which the technical features of the present disclosure can be applied.

In step S1400, the gNB receives a resume request message from a wireless device.

In step S1410, the gNB receives UE Context Retrieve Failure message including a small data indication from a last serving gNB. The small data indication indicates not relocating a UE context from the last serving gNB to the gNB.

In some implementations, a path switch procedure towards the core network may be skipped based on the small data indication.

In some implementations, the UE Context Retrieve Failure message may include UL UP TNL information for setting up a forwarding tunnel for UL data from the wireless device. The gNB may receive the UL data from the wireless device, and forward the UL data towards the core network via the last serving gNB based on the UL UP TNL information, e.g., on the forwarding tunnel which is set up according to the UL UP TNL information.

In step S1420, upon receiving the UE Context Retrieve Failure message, the gNB transmits DL UP TNL information to the last serving gNB.

In step S1430, the gNB receives a resume message from the last serving gNB and forwarding the resume message to the wireless device.

In step S1440, the gNB receives DL data from a core network via the last serving gNB based on the DL UP TNL information.

In step S1450, the gNB forwards the DL data to the wireless device.

In step S1460, the gNB receives a resume complete message from the wireless device and forwarding the resume complete message to the last serving gNB.

Figure 15A:
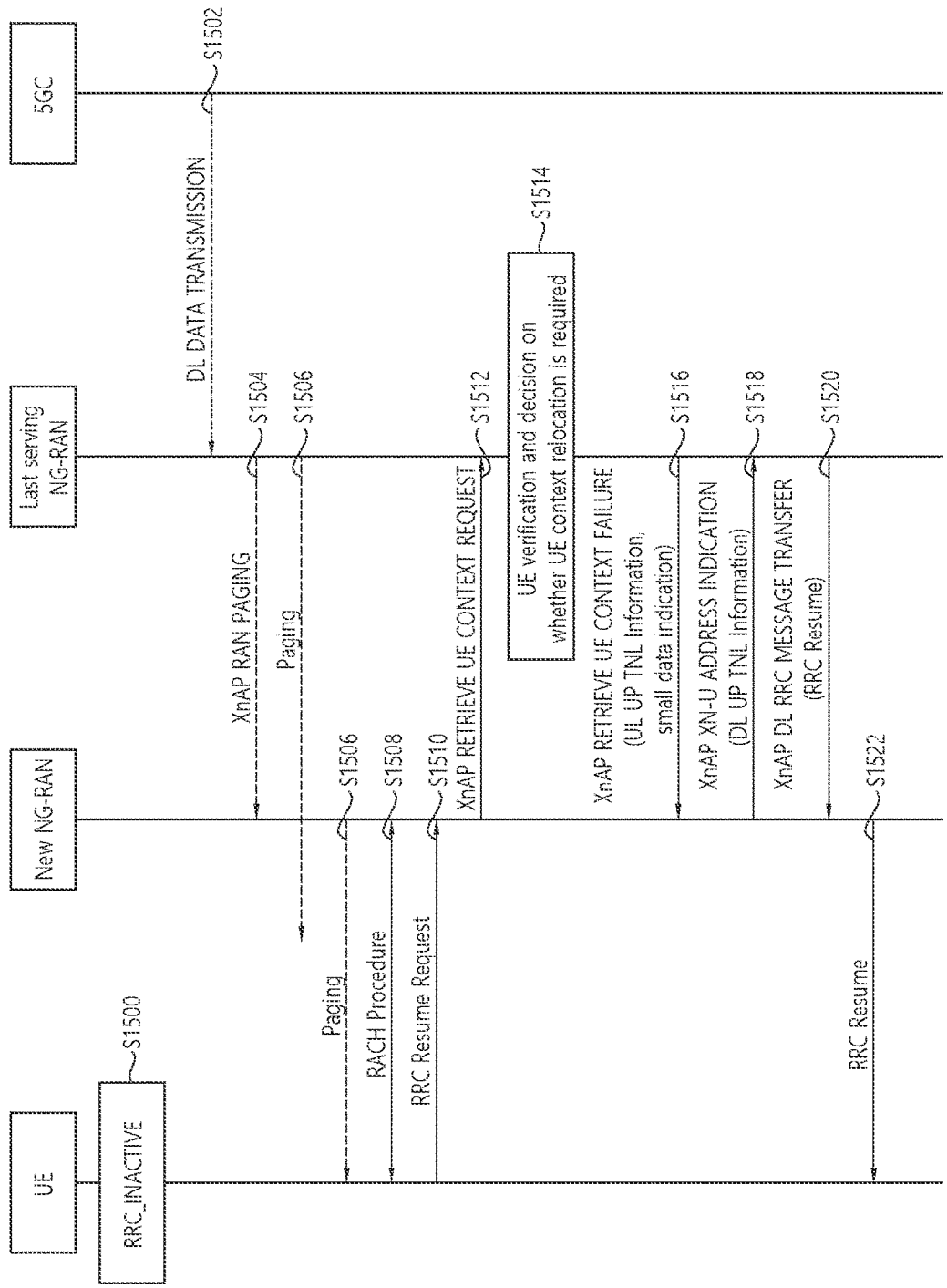
FIG. 15A and FIG. 15B shows an example of a small data transmission procedure with no UE context relocation to which the technical features of the present disclosure can be applied.
Figure 15B:
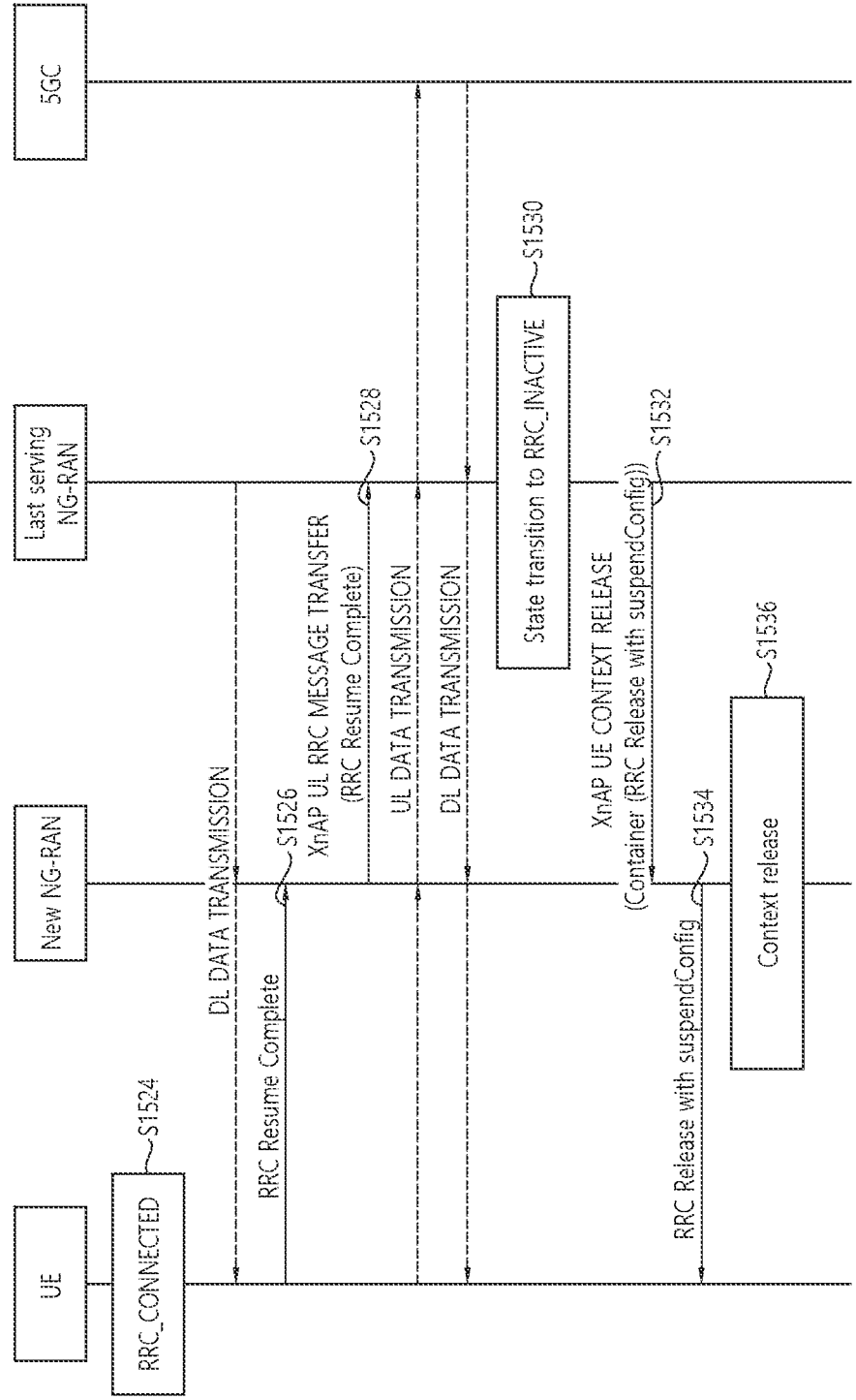

FIG. 15A and FIG. 15B shows an example of a small data transmission procedure with no UE context relocation to which the technical features of the present disclosure can be applied.

In this example shown in FIG. 15A and FIG. 15B, the XnAP Retrieve UE Context Failure message delivers data forwarding address.

First, FIG. 15A is described.

Step S1500: The UE is in RRC_INACTIVE. The UE and last serving NG-RAN store the UE context, respectively. The NG-C connection between last serving NG-RAN and AMF is maintained. In addition, the NG-U connection between last serving NG-RAN and UPF is maintained.

Step S1502: The last serving NG-RAN may receive DL data on NG-U interface.

Step S1504: The last serving NG-RAN may send the XnAP RAN Paging message to the neighbor NG-RANs in same RNA. For example, the XnAP RAN Paging message may be transmitted to the new NG-RAN.

Step S1506: Each NG-RAN sends Paging message to the UE.

Steps S1502 to S1506 described above may be needed only in case of DL data transmission.

Step S1508: When the UE is being paged and/or when new UL data arrives in the UL buffer, the UE initiates a RACH procedure. In this example, it is assumed that the UE moves into new NG-RAN.

Step S1510: The UE initiates RRC connection resumption by sending an RRC Resume Request message to the new NG-RAN. The RRC Resume Request message may include at least one of I-RNTI for the UE, RRC resume cause, and/or authentication token (e.g., Resume MAC-I). The RRC Resume Request message may be replaced with a new message.

Step S1512: Upon receiving the RRC Resume Request message from the UE, the new NG-RAN first checks whether it is able to find the UE context or not. If not, the new NG-RAN resolves the node identity contained in the I-RNTI, and requests the last serving NG-RAN to provide UE context by initiating the XnAP Retrieve UE Context procedure (e.g., transmitting an XnAP Retrieve UE Context Request message).

Step S1514: The last serving NG-RAN checks whether it is able to find the UE context or not. If yes, the last serving NG-RAN decides whether the UE context relocation to the new NG-RAN is required or not. For the frequent small data transmission (e.g., single PDCP PDUs in uplink and/or single PDCP PDUs in downlink), the last serving NG-RAN decides to keep the UE context and the UE-associated NG connection with the serving AMF and UPF.

Step S1516: Since the last serving NG-RAN decides not to relocate the UE context in step S1514, the last serving gNB sends the XnAP Retrieve UE Context Failure message to the new NG-RAN. The XnAP Retrieve UE Context Failure message may be replaced with a new message.

The XnAP Retrieve UE Context Failure message includes UL UP TNL information and small data indication. The UL UP TNL information may be used to setup forwarding tunnel for the UL data from the UE over the Xn interface. The small data indication may be used to inform the new NG-RAN of not relocating the UE context and skipping the path switch procedure.

Step S1518: The new NG-RAN responses to the last serving NG-RAN with the XnAP XN-U Address Indication message including DL UP TNL information for DL data forwarding from the last serving NG-RAN. The XnAP XN-U Address Indication message may be replaced with a new message.

Step S1520: The last serving NG-RAN generates the RRC Resume message to indicate to the UE that the RRC connection is resumed. The RRC Resume message may be replaced with a new message. Then, the last serving NG-RAN sends the XnAP DL RRC Message Transfer message containing the RRC Resume message. The XnAP DL RRC Message Transfer message may be replaced with a new message.

Step S1522: The new NG-RAN transparently forwards the RRC Resume message to the UE.

FIG. 15B, which follows FIG. 15A, is described.

Step S1524: The UE is now in RRC_CONNECTED.

If there is pending DL data in the last serving NG-RAN, the DL data may be forwarded to the UE via the new NG-RAN over the Xn interface.

Step S1526: The UE responses with the RRC Resume Complete message to the new NG-RAN. The RRC Resume Complete message may be replaced with a new message.

Step S1528: Upon receiving the RRC Resume Complete message from the UE, the new NG-RAN sends to the last serving NG-RAN the XnAP UL RRC Message Transfer message containing the RRC Resume Complete message. The XnAP UL RRC Message Transfer message may be replaced with a new message. Based on the RRC Resume Complete message, the last serving NG-RAN can be aware of successful state transition to RRC_CONNECTED for the UE. The UL/DL data may be forwarded via the new NG-RAN and last serving NG-RAN.

Step S1530: Based on an expiry of the local timer in the last serving NG-RAN, the AS Release Assistance Indication from the UE, or other reasons (e.g., end marker from the UE and/or 5GC), the last serving NG-RAN may decide to transit the UE from RRC_CONNECTED to RRC_INACTIVE.

Step S1532: To make the UE enter RRC_INACTIVE again, the last serving NG-RAN generates the RRC Release message with suspendConfig. By using the RRC Release message with suspendConfig, the last serving NG-RAN may allocate update information, such as a new I-RNTI, RNA, and/or {NCC, NH} pair, to the UE.

Then, the last serving NG-RAN sends the XnAP UE Context Release message containing the RRC Release message with suspendConfig. The XnAP UE Context Release message may be replaced with a new message.

Alternatively, the last serving NG-RAN may send the XnAP UE Context Release Required message including the RRC Release message with suspendConfig to check whether there is the remaining UL data from the UE in the new NG-RAN. The XnAP UE Context Release Required message may be replaced with a new message.

Step S1534: Upon receiving the XnAP UE Context Release message containing the RRC Release message with suspendConfig, the new NG-RAN transparently forwards the RRC Release message with suspendConfig to the UE.

If the XnAP UE Context Release Required message is received and there is no remaining UL data, the new NG-RAN may transparently forward the RRC Release message with suspendConfig to the UE and respond to the last serving NG-RAN with the XnAP UE Context Release Confirm message. If the XnAP UE Context Release Required message is received and there is remaining UL data, the new NG-RAN responses to the last serving NG-RAN with the XnAP UE Context Release Reject message with a new cause value to inform there is remaining UL data from the UE.

Step S1536: The new NG-RAN releases radio and control plane related resources associated to the UE context.

Figure 16A:
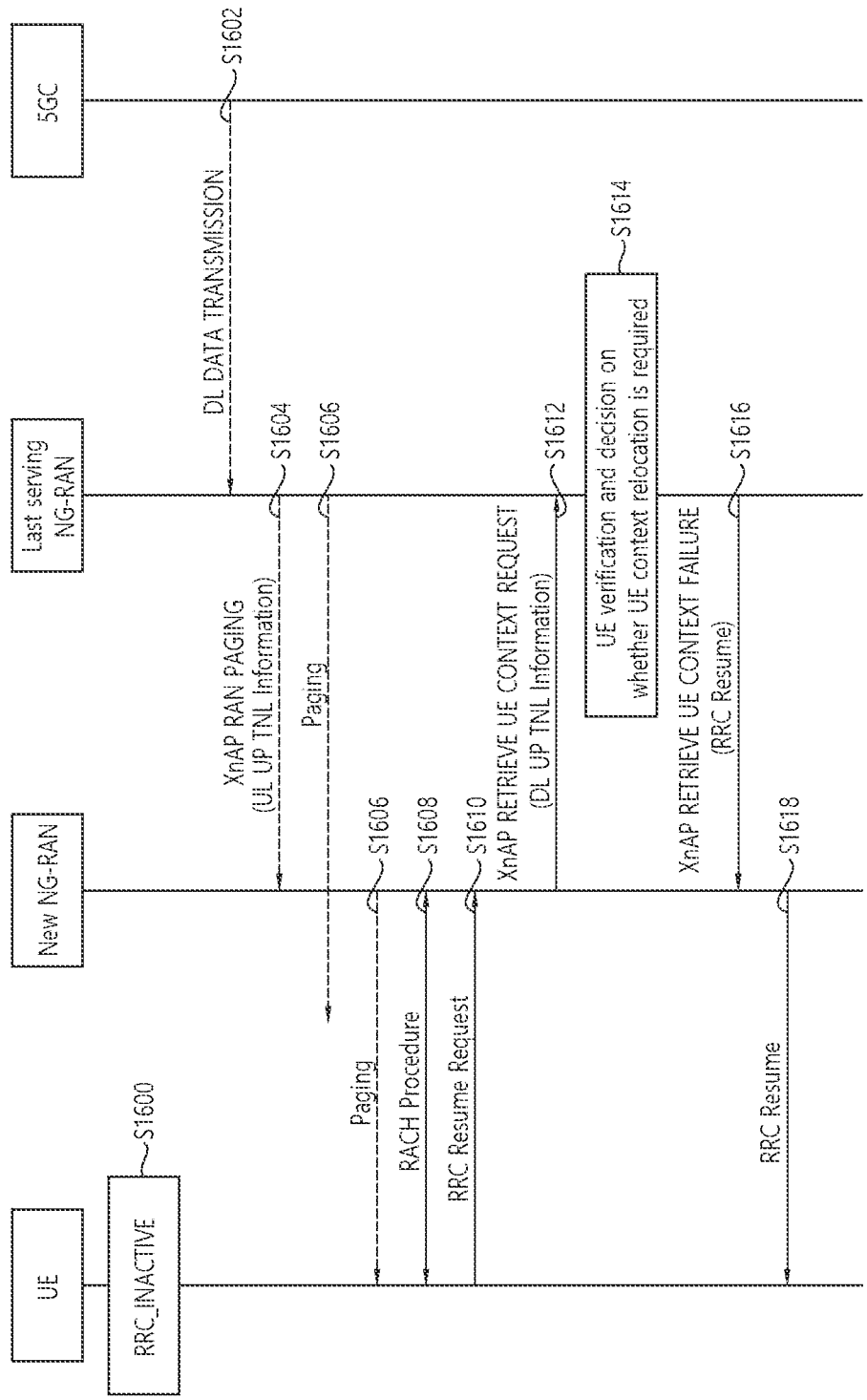
FIG. 16A and FIG. 16B shows another example of a small data transmission procedure with no UE context relocation to which the technical features of the present disclosure can be applied.
Figure 16B:
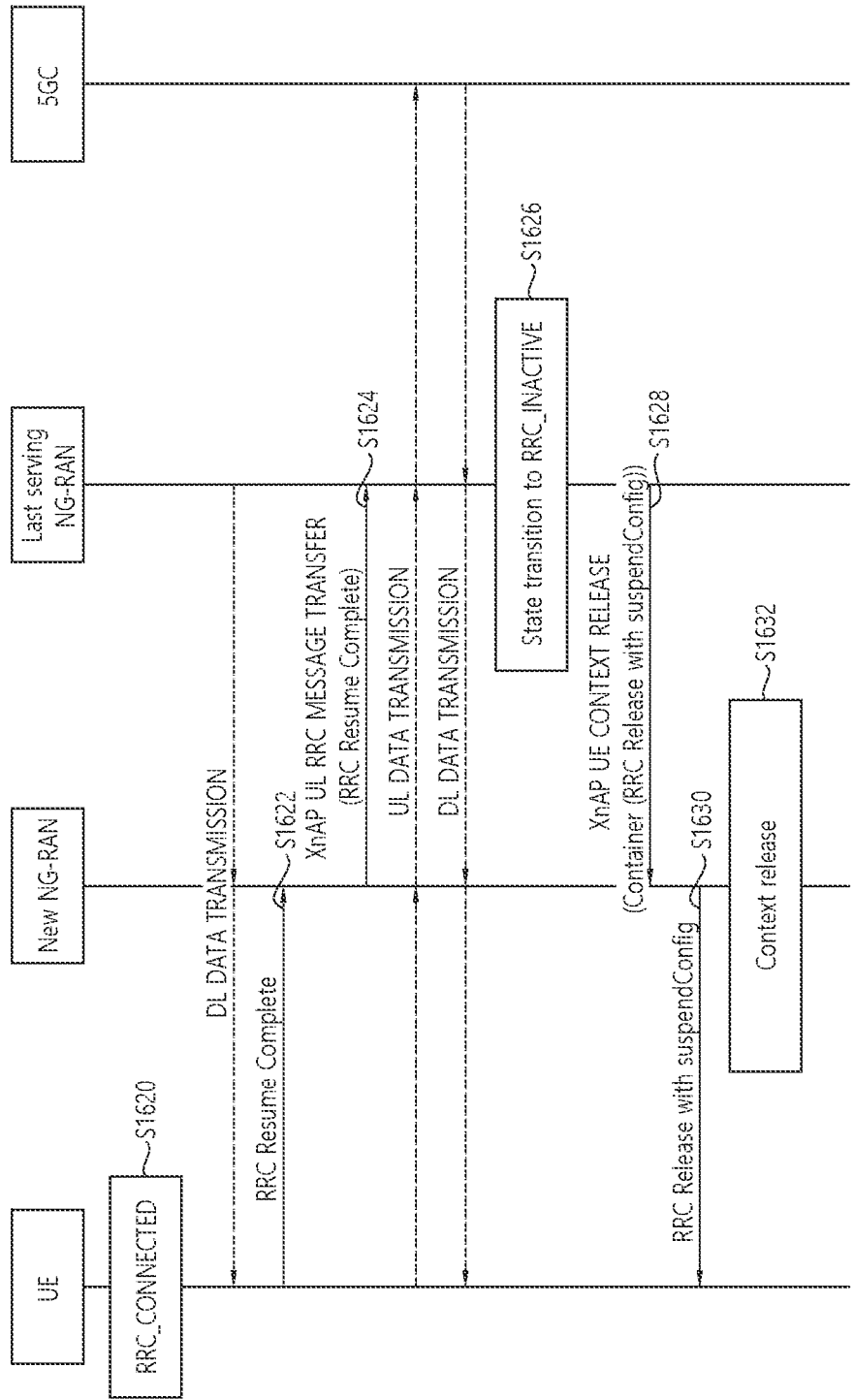

FIG. 16A and FIG. 16B shows another example of a small data transmission procedure with no UE context relocation to which the technical features of the present disclosure can be applied.

In this example shown in FIG. 16A and FIG. 16B, the XnAP RAN Paging message delivers data forwarding address.

First, FIG. 16A is described.

Each of steps S1600 to S1602 shown in FIG. 16A corresponds to each of steps S1500 to S1502 shown in FIG. 15A.

Step S1604: The last serving NG-RAN may send the XnAP RAN Paging message to the neighbor NG-RANs in same RNA. For example, the XnAP RAN PAGING message may be transmitted to the new NG-RAN.

For small data transmission without context relocation, the XnAP RAN PAGING message may include UL UP TNL information to setup forwarding tunnel for the UL data from the UE over the Xn interface. The UL UP TNL information may also be used to inform the new NG-RAN of not relocating the UE context and skipping the path switch procedure.

Each of steps S1606 to S1610 shown in FIG. 16A corresponds to each of steps S1506 to S1510 shown in FIG. 15A.

Step S1612: Upon receiving the RRC Resume Request message from the UE, the new NG-RAN first checks whether it is able to find the UE context or not. If not, the new NG-RAN resolves the node identity contained in the I-RNTI, and requests the last serving NG-RAN to provide UE context by initiating the XnAP Retrieve UE Context procedure (e.g., transmitting an XnAP Retrieve UE Context Request message).

When the UL UP TNL information is received in step S1604, the new NG-RAN may also include DL UP TNL information for DL data forwarding from the last serving NG-RAN into the XnAP Retrieve UE Context Request message.

Step S1614 shown in FIG. 16A corresponds to step S1514 shown in FIG. 15A.

Step S1616: Since the last serving NG-RAN decides not to relocate the UE context in step S1614, the last serving NG-RAN sends the XnAP Retrieve UE Context Failure message to the new NG-RAN. The XnAP Retrieve UE Context Failure message may be replaced with a new message.

The XnAP Retrieve UE Context Failure message contains the RRC Resume message to indicate to the UE that the RRC connection is resumed. The RRC Resume message may be replaced with a new message.

Step S1618 shown in FIG. 16A corresponds to step S1522 shown in FIG. 15A.

FIG. 16B, which follows FIG. 16A, is described.

Each of steps S1620 to S1632 shown in FIG. 16B corresponds to each of steps S1524 to S1536 shown in FIG. 15B.

According to the embodiment 3 of the present disclosure shown in FIG. 14, FIG. 15A, FIG. 15B, FIG. 16A and FIG. 16B, the last serving NG-RAN can establish data forwarding tunnel towards the new NG-RAN with no context relocation. By using a new indication, e.g., small data indication, the last serving NG-RAN can indicate to the new NG-RAN to skip the path switch procedure towards the core network. Furthermore, according to the example shown in FIG. 16A and FIG. 16B, the number of transmissions of XnAP messages can be reduced compared to the example shown in FIG. 15A and FIG. 15B.

4. Implementation 4

According to the implementation 4 of the present disclosure, after the last serving NG-RAN fails the AMF-triggered UE-associated procedure, the last serving NG-RAN may decide to change role of the node serving the UE with the new NG-RAN and request switch of DL termination point of the NG-U transport bearer towards the new NG-RAN.

According to the implementation 4 of the present disclosure, after the small data transmission, the UE may initiate RNA update procedure by the indication from the NG-RAN.

According to the implementation 4 of the present disclosure, if the RRC state reporting is requested by the AMF during previous RRC_CONNECTED, the last serving NG-RAN may indicate the current RRC state with the small data transmission indication to the AMF. This indication may enable the AMF to hold on the triggering of UE-associated signaling towards the last serving NG-RAN.

Figure 17:
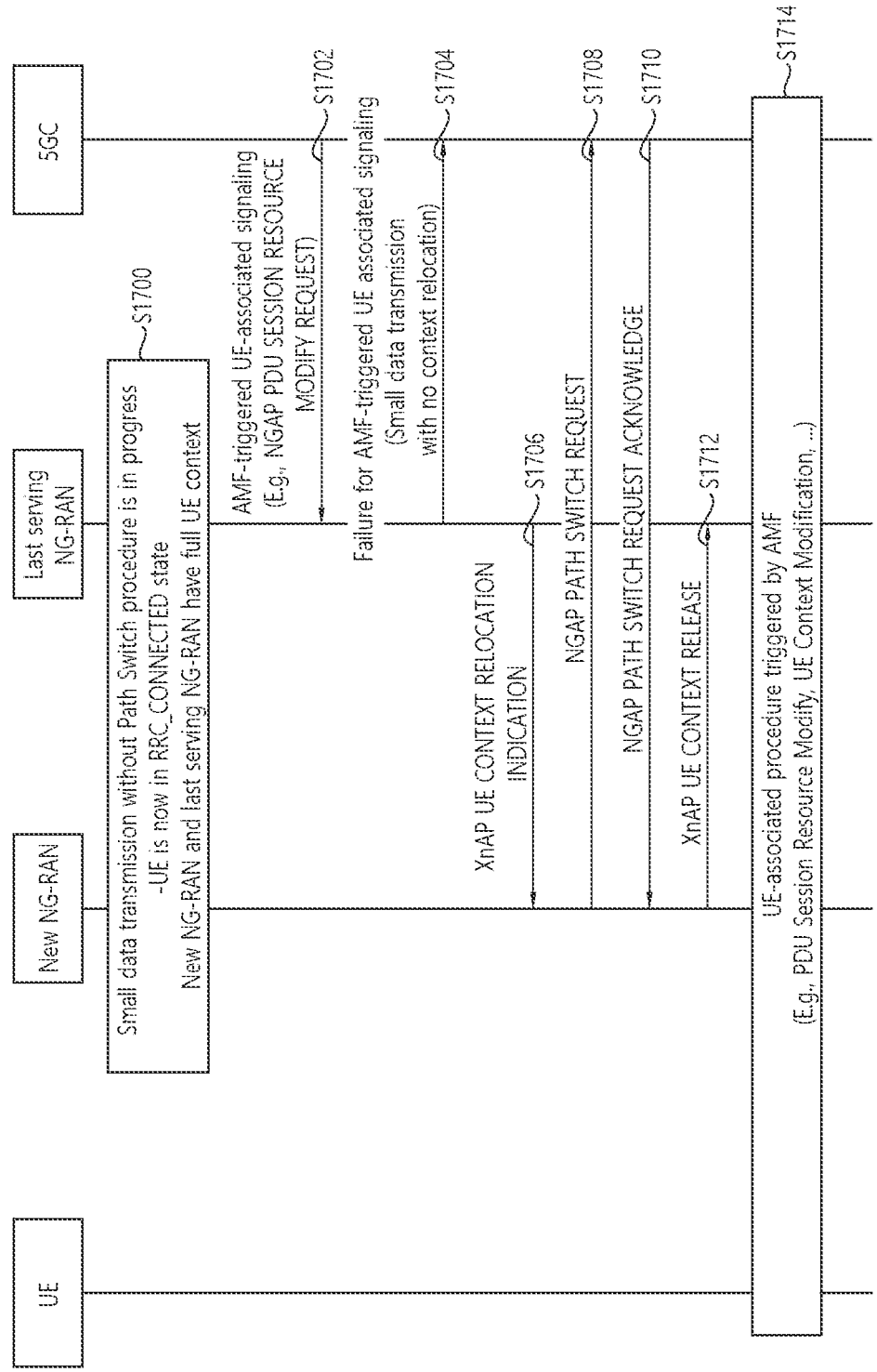
FIG. 17 shows an example of a procedure to support AMF-triggered UE-associated signaling during small data transmission with duplicated UE context to which the technical features of the present disclosure is applied.

FIG. 17 shows an example of a procedure to support AMF-triggered UE-associated signaling during small data transmission with duplicated UE context to which the technical features of the present disclosure is applied.

Step S1700: The small data transmission without the path switch procedure is in progress. For example, operations shown in FIGS. 12A/12B and/or operations shown in FIGS. 13A/13B may be performed for the small data transmission without the path switch procedure. The UE is now in RRC_CONNECTED. Both new NG-RAN and last serving NG-RAN have full UE context, as described in FIGS. 12A/12B and/or FIGS. 13A/13B.

Step S1702: The AMF may send the UE-associated signaling (e.g., NGAP PDU SESSION RESOURCE MODIFY REQUEST message) to the last serving NG-RAN to initiate the UE-associated procedure (e.g., PDU Session Resource Modify, UE Context Modification).

Step S1704: Since the UE is located in the new NG-RAN due to mobility, it is not reachable at the last serving NG-RAN directly. Hence, the last serving NG-RAN fails any AMF-initiated UE-associated class 1 procedure. Then, the last serving NG-RAN performs signaling of unsuccessful operation in the respective response message with a cause value "small data transmission with no context relocation". Based on this cause value, the AMF can be aware of UE mobility and hold on triggering of the UE-associated signaling until the end of the path switch procedure.

If there is the pending NAS-PDU to be sent to the UE, the last serving NG-RAN may also trigger the NAS Non Delivery Indication procedure to report the non-delivery of any NAS PDU received from the AMF for the UE.

Step S1706: The last serving NG-RAN sends the XnAP UE Context Relocation Indication message to the new NG-RAN to request switch of DL termination point of the NG-U transport bearer towards the new NG-RAN. The XnAP UE Context Relocation Indication message may be replaced with a new message.

Step S1708/S1710: Upon receiving the XnAP UE Context Relocation Indication message from the last serving NG-RAN in step S1706, the new NG-RAN becomes the serving NG-RAN and then performs path switch towards the 5GC.

Step S1712: The new NG-RAN triggers release of the UE resources at the last serving NG-RAN.

Step S1714: The AMF initiates the UE-associated procedure towards the new NG-RAN.

Figure 18:
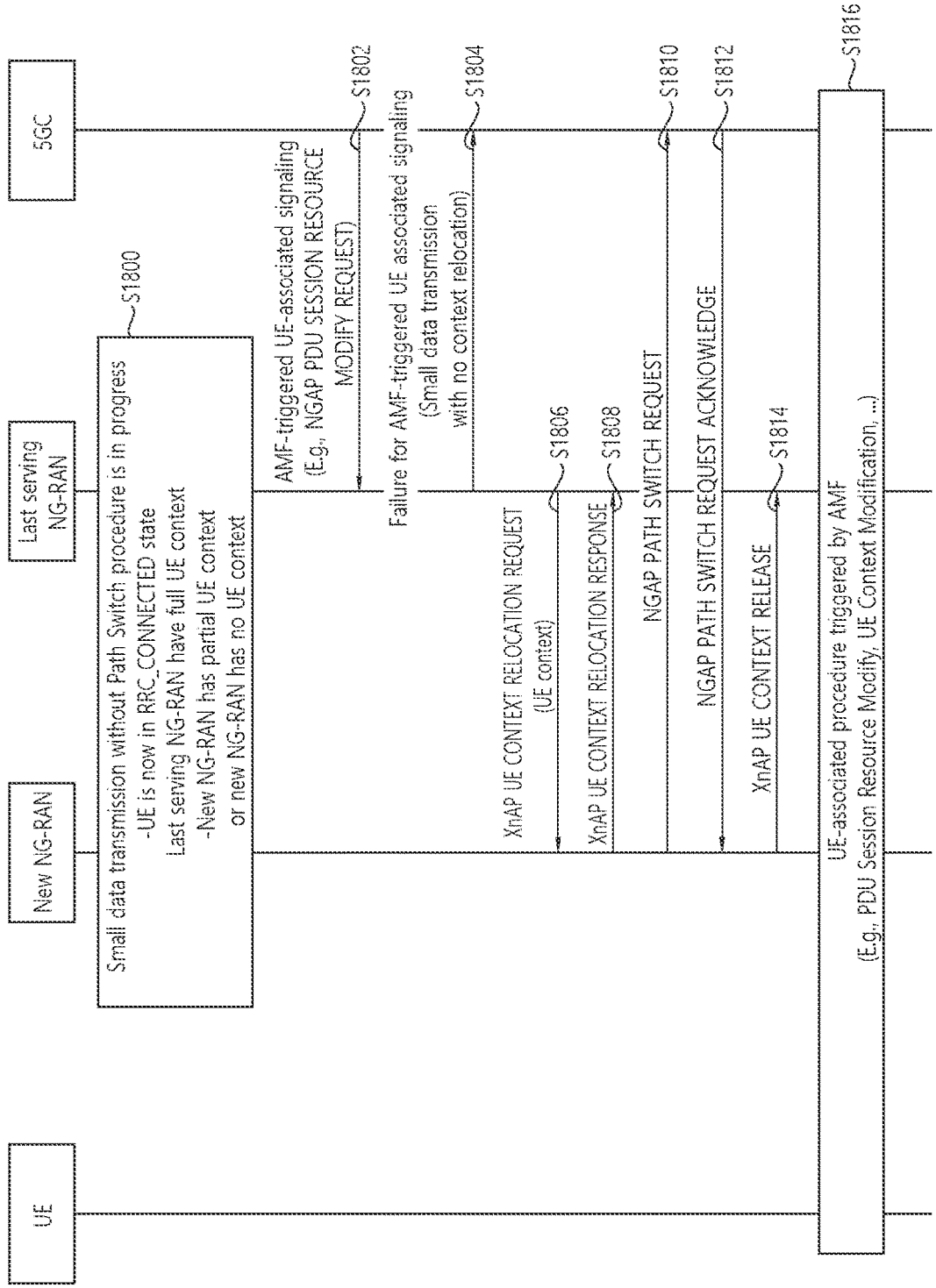
FIG. 18 shows an example of a procedure to support AMF-triggered UE-associated signaling during small data transmission with partial or no UE context relocation to which the technical features of the present disclosure is applied.

FIG. 18 shows an example of a procedure to support AMF-triggered UE-associated signaling during small data transmission with partial or no UE context relocation to which the technical features of the present disclosure is applied.

Step S1800: The small data transmission without the path switch procedure is in progress. For example, operations shown in FIGS. 10A/10B may be performed for the small data transmission without the path switch procedure. In this case, the new NG-RAN has partial UE context. For example, operations shown in FIGS. 15A/15B and/or operations shown in FIGS. 16A/16B may be performed for the small data transmission without the path switch procedure. In this case, the new NG-RAN has no UE context. The UE is now in RRC_CONNECTED. The last serving NG-RAN has full UE context.

Each of steps S1802 to S1804 shown in FIG. 18 corresponds to each of steps S1702 to S1704 shown in FIG. 17.

Step S1806: The last serving NG-RAN sends the XnAP Context Relocation Request message containing full UE context to the new NG-RAN. The XnAP Context Relocation Request message may be replaced with a new message.

Step S1808: Upon receiving the XnAP Context Relocation Request message from the last serving NG-RAN in step S1806, the new NG-RAN becomes the serving NG-RAN and then responds with the XnAP Context Relocation Response message to the last serving NG-RAN. The XnAP Context Relocation Response message may be replaced with a new message.

Step S1810/S1812: The new NG-RAN performs path switch towards the 5GC.

Each of steps S1814 to S1816 shown in FIG. 18 corresponds to each of steps S1712 to S1714 shown in FIG. 17.

Figure 19:
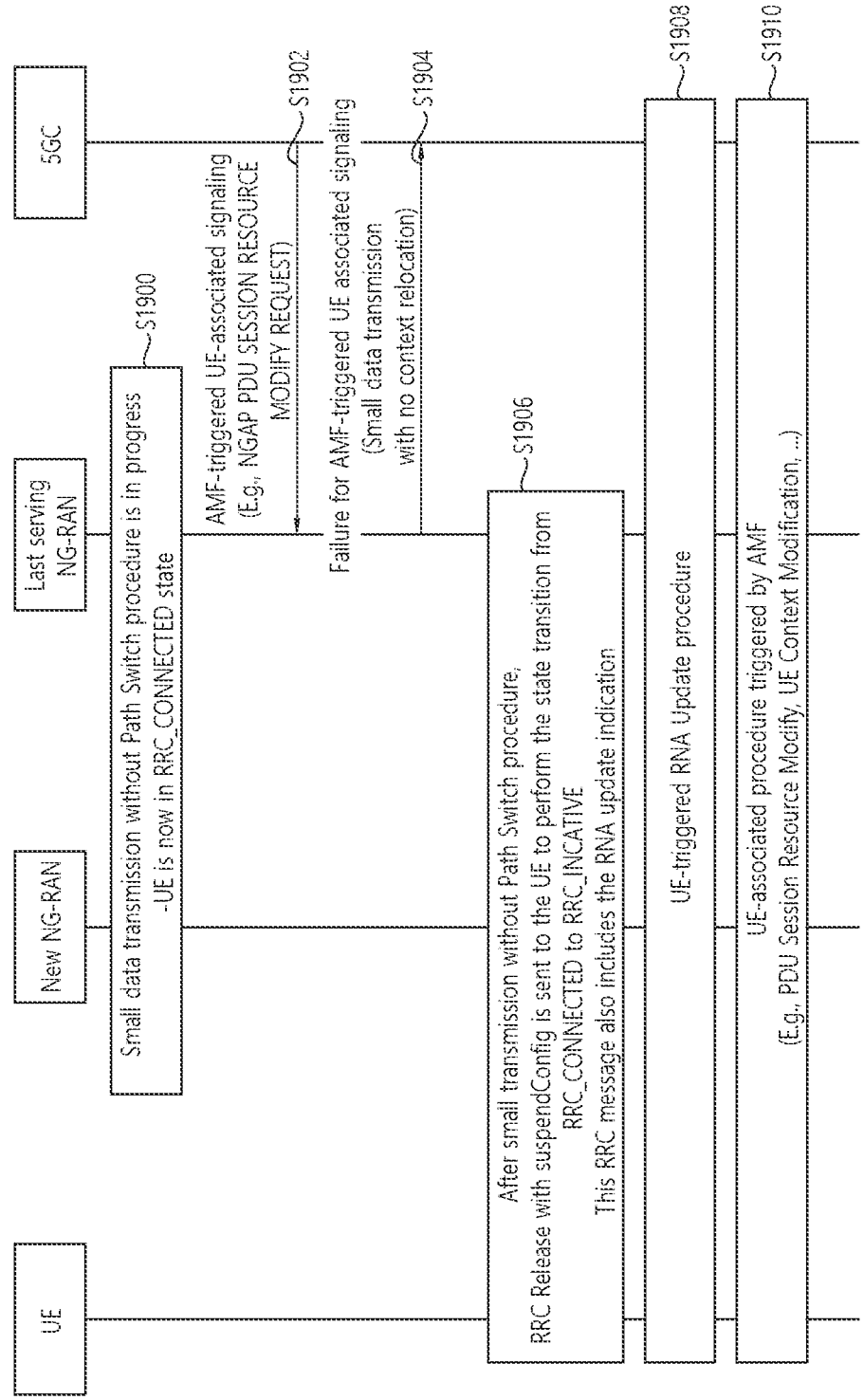
FIG. 19 shows an example of a procedure to support AMF-triggered UE-associated signaling by RNA update to which the technical features of the present disclosure is applied.

FIG. 19 shows an example of a procedure to support AMF-triggered UE-associated signaling by RNA update to which the technical features of the present disclosure is applied.

Step S1900: The small data transmission without the path switch procedure is in progress. For example, operations shown in FIGS. 10A/10B may be performed for the small data transmission without the path switch procedure. For example, operations shown in FIGS. 12A/12B and/or operations shown in FIGS. 13A/13B may be performed for the small data transmission without the path switch procedure. For example, operations shown in FIGS. 15A/15B and/or operations shown in FIGS. 16A/16B may be performed for the small data transmission without the path switch procedure. The UE is now in RRC_CONNECTED.

Each of steps S1902 to S1904 shown in FIG. 19 corresponds to each of steps S1702 to S1704 shown in FIG. 17.

Step S1906: After small data transmission without path switch procedure, the RRC Release message with suspendConfig is sent to the UE to perform RRC state transition from RRC_CONNECTED to RRC_INACTIVE. The RRC Release message with suspendConfig may also include RNA update indication to request the initiation of the RNA update to the UE.

Step S1908: Upon receiving RRC Release message with suspendConfig including the RNA update indication in step S1906, the UE triggers RNA update procedure towards the new NG-RAN. During the RNA update procedure, the UE context is relocated to the new NG-RAN, and then the path switch procedure is triggered towards the 5GC.

Step S1910: The AMF initiates the UE-associated procedure towards the new NG-RAN.

Figure 20:
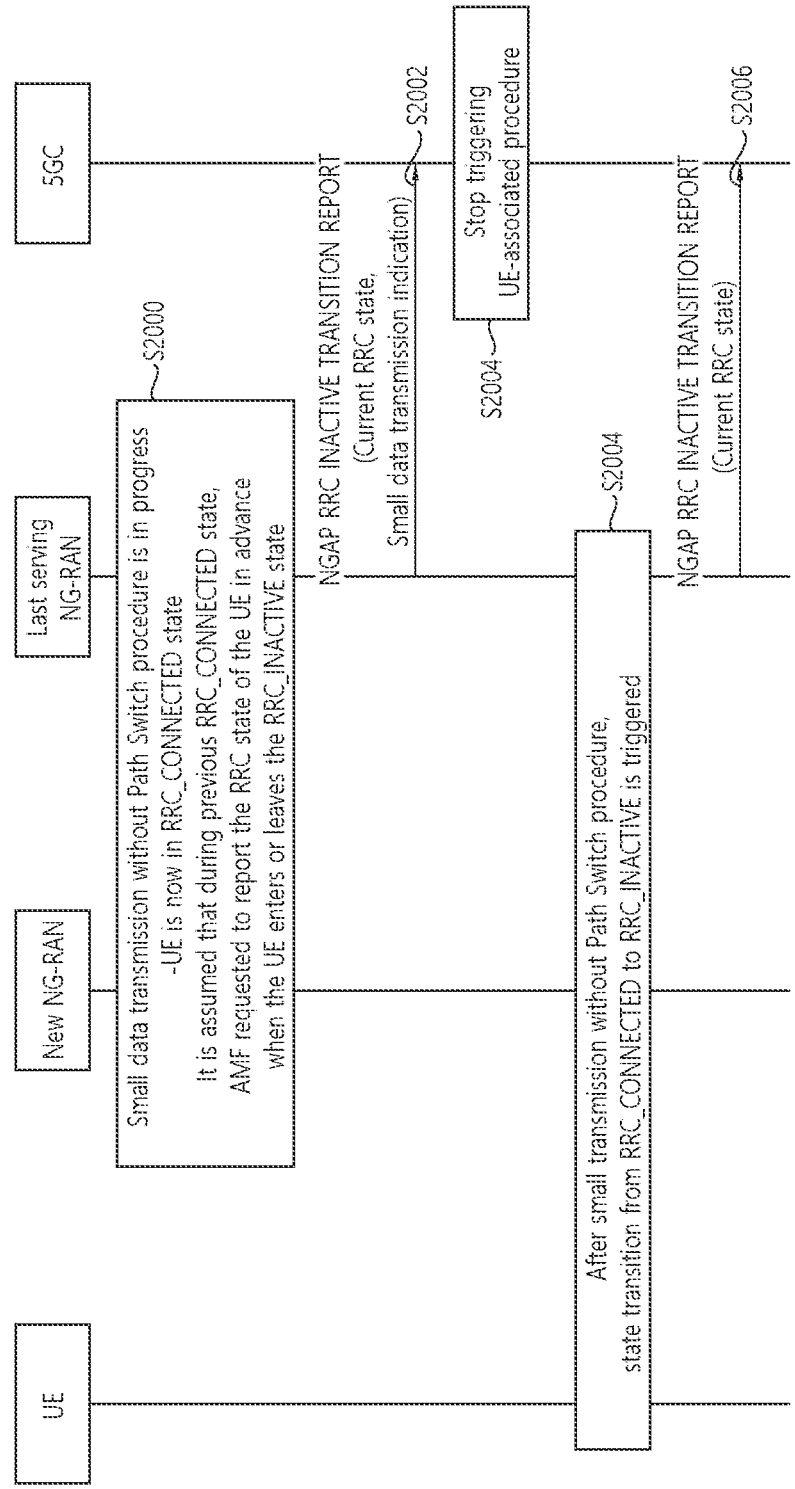
FIG. 20 shows an example of a procedure to support AMF-triggered UE-associated signaling by RRC state reporting to which the technical features of the present disclosure is applied.

FIG. 20 shows an example of a procedure to support AMF-triggered UE-associated signaling by RRC state reporting to which the technical features of the present disclosure is applied.

Step S2000: The small data transmission without the path switch procedure is in progress. For example, operations shown in FIGS. 10A/10B may be performed for the small data transmission without the path switch procedure. For example, operations shown in FIGS. 12A/12B and/or operations shown in FIGS. 13A/13B may be performed for the small data transmission without the path switch procedure. For example, operations shown in FIGS. 15A/15B and/or operations shown in FIGS. 16A/16B may be performed for the small data transmission without the path switch procedure. The UE is now in RRC_CONNECTED. It is also assumed that during previous RRC_CONNECTED, the AMF requested from the UE to report RRC state of the UE in advance when the UE enters and/or leaves RRC_INACTIVE.

Step S2002: The last serving sends the NGAP NG-RAN RRC Inactive Transition Report message including the current RRC state (i.e., RRC_CONNECTED) to the AMF. The NGAP NG-RAN RRC Inactive Transition Report message also includes small data transmission indication to inform the AMF of triggering the small data transmission without the Path Switch procedure.

Step S2004: Upon receiving the NGAP NG-RAN RRC Inactive Transition Report message from the last serving NG-RAN, the AMF stops triggering the UE-associated procedure towards the last serving NG-RAN.

Step S2006: After small data transmission without path switch procedure, the RRC state transition from RRC_CONNECTED to RRC_INACTIVE is triggered.

Step S2008: The last serving sends the NGAP NG-RAN RRC Inactive Transition Report message including the current RRC state (i.e., RRC_INACTIVE) to the AMF.

According to the embodiment 4 of the present disclosure shown in FIG. 17 to FIG. 20, the last serving NG-RAN can initiate UE context relocation to the new NG-RAN during small data transmission without the path switch procedure due to the AMF-triggered UE-associated signaling. Therefore, unnecessary NG signaling triggered by the AMF can be reduced.

The present disclosure may be applied to the UE in RRC_INACTIVE connected to EPS.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 21:
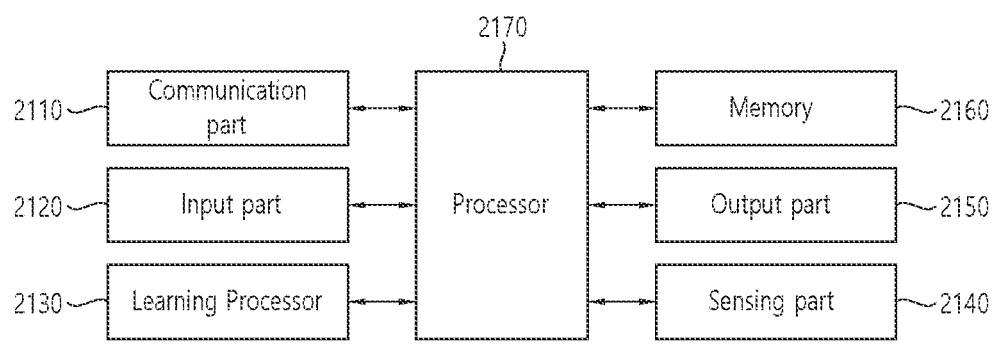
FIG. 21 shows an example of an AI device to which the technical features of the present disclosure can be applied.

FIG. 21 shows an example of an AI device to which the technical features of the present disclosure can be applied.

The AI device 2100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 21, the AI device 2100 may include a communication part 2110, an input part 2120, a learning processor 2130, a sensing part 2140, an output part 2150, a memory 2160, and a processor 2170.

The communication part 2110 can transmit and/or receive data to and/or from external devices such as the AI devices and the AI server using wire and/or wireless communication technology. For example, the communication part 2110 can transmit and/or receive sensor information, a user input, a learning model, and a control signal with external devices. The communication technology used by the communication part 2110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2120 can acquire various kinds of data. The input part 2120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2120 can acquire input data to be used when acquiring an output using learning data and a learning model for model learning. The input part 2120 may obtain raw input data, in which case the processor 2170 or the learning processor 2130 may extract input features by preprocessing the input data.

The learning processor 2130 may learn a model composed of an ANN using learning data. The learned ANN can be referred to as a learning model. The learning model can be used to infer result values for new input data rather than learning data, and the inferred values can be used as a basis for determining which actions to perform. The learning processor 2130 may perform AI processing together with the learning processor of the AI server. The learning processor 2130 may include a memory integrated and/or implemented in the AI device 2100. Alternatively, the learning processor 2130 may be implemented using the memory 2160, an external memory directly coupled to the AI device 2100, and/or a memory maintained in an external device.

The sensing part 2140 may acquire at least one of internal information of the AI device 2100, environment information of the AI device 2100, and/or the user information using various sensors. The sensors included in the sensing part 2140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2150 may generate an output related to visual, auditory, tactile, etc. The output part 2150 may include a display unit for outputting visual information, a speaker for outputting auditory information, and/or a haptic module for outputting tactile information.

The memory 2160 may store data that supports various functions of the AI device 2100. For example, the memory 2160 may store input data acquired by the input part 2120, learning data, a learning model, a learning history, etc.

The processor 2170 may determine at least one executable operation of the AI device 2100 based on information determined and/or generated using a data analysis algorithm and/or a machine learning algorithm. The processor 2170 may then control the components of the AI device 2100 to perform the determined operation. The processor 2170 may request, retrieve, receive, and/or utilize data in the learning processor 2130 and/or the memory 2160, and may control the components of the AI device 2100 to execute the predicted operation and/or the operation determined to be desirable among the at least one executable operation. The processor 2170 may generate a control signal for controlling the external device, and may transmit the generated control signal to the external device, when the external device needs to be linked to perform the determined operation. The processor 2170 may obtain the intention information for the user input and determine the user's requirements based on the obtained intention information. The processor 2170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2130 and/or learned by the learning processor of the AI server, and/or learned by their distributed processing. The processor 2170 may collect history information including the operation contents of the AI device 2100 and/or the user's feedback on the operation, etc. The processor 2170 may store the collected history information in the memory 2160 and/or the learning processor 2130, and/or transmit to an external device such as the AI server. The collected history information can be used to update the learning model. The processor 2170 may control at least some of the components of AI device 2100 to drive an application program stored in memory 2160. Furthermore, the processor 2170 may operate two or more of the components included in the AI device 2100 in combination with each other for driving the application program.

Figure 22:
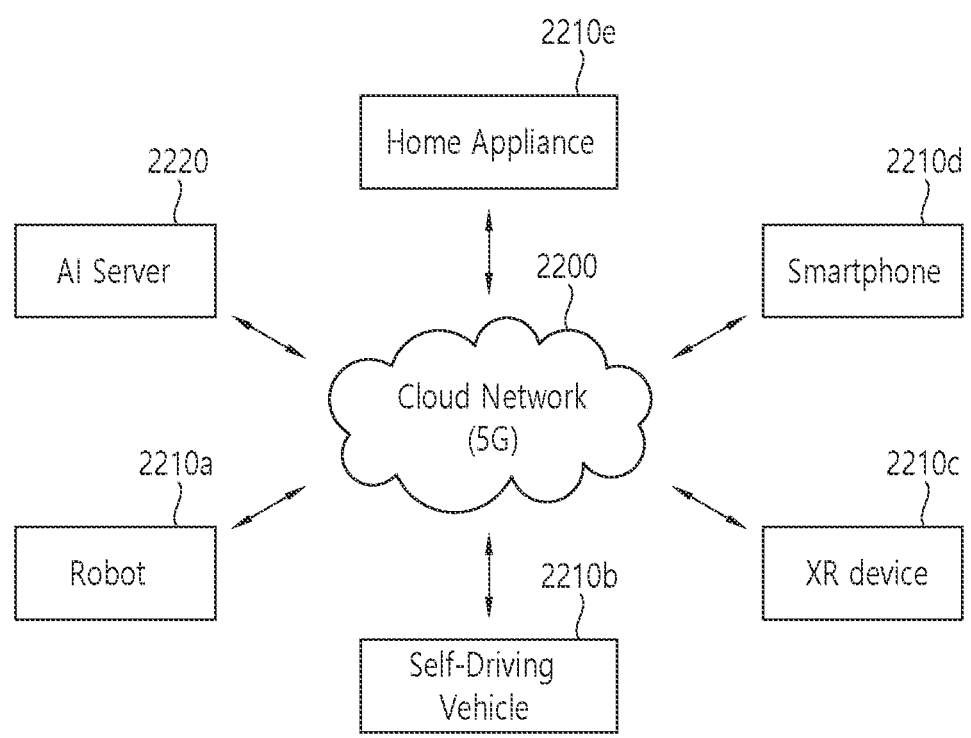
FIG. 22 shows an example of an AI system to which the technical features of the present disclosure can be applied.

FIG. 22 shows an example of an AI system to which the technical features of the present disclosure can be applied.

Referring to FIG. 22, in the AI system, at least one of an AI server 2220, a robot 2210a, an autonomous vehicle 2210b, an XR device 2210c, a smartphone 2210d and/or a home appliance 2210e is connected to a cloud network 2200. The robot 2210a, the autonomous vehicle 2210b, the XR device 2210c, the smartphone 2210d, and/or the home appliance 2210e to which the AI technology is applied may be referred to as AI devices 2210a to 2210e.

The cloud network 2200 may refer to a network that forms part of a cloud computing infrastructure and/or resides in a cloud computing infrastructure. The cloud network 2200 may be configured using a 3G network, a 4G or LTE network, and/or a 5G network. That is, each of the devices 2210a to 2210e and 2220 consisting the AI system may be connected to each other through the cloud network 2200. In particular, each of the devices 2210a to 2210e and 2220 may communicate with each other through a base station, but may directly communicate with each other without using a base station.

The AI server 2220 may include a server for performing AI processing and a server for performing operations on big data. The AI server 2220 is connected to at least one or more of AI devices constituting the AI system, i.e., the robot 2210a, the autonomous vehicle 2210b, the XR device 2210c, the smartphone 2210d and/or the home appliance 2210e through the cloud network 2200, and may assist at least some AI processing of the connected AI devices 2210a to 2210e. The AI server 2220 can learn the ANN according to the machine learning algorithm on behalf of the AI devices 2210a to 2210e, and can directly store the learning models and/or transmit them to the AI devices 2210a to 2210e. The AI server 2220 may receive the input data from the AI devices 2210a to 2210e, infer the result value with respect to the received input data using the learning model, generate a response and/or a control command based on the inferred result value, and transmit the generated data to the AI devices 2210a to 2210e. Alternatively, the AI devices 2210a to 2210e may directly infer a result value for the input data using a learning model, and generate a response and/or a control command based on the inferred result value.

Various embodiments of the AI devices 2210a to 2210e to which the technical features of the present disclosure can be applied will be described. The AI devices 2210a to 2210e shown in FIG. 22 can be seen as specific embodiments of the AI device 2100 shown in FIG. 21.

The present disclosure can have various advantageous effects.

For example, the last serving NG-RAN can establish data forwarding tunnel towards the new NG-RAN with efficient UE context transfer and skipping the path switch procedure.

For example, the last serving NG-RAN can establish data forwarding tunnel towards the new NG-RAN by reusing the existing Retrieve UE Context procedure with a new indication, e.g., anchor kept indication.

For example, the last serving NG-RAN can establish data forwarding tunnel towards the new NG-RAN by with no context relocation. By using a new indication, e.g., small data indication, the last serving NG-RAN can indicate to the new NG-RAN to skip the path switch procedure towards the core network.

For example, the last serving NG-RAN can establish data forwarding tunnel towards the new NG-RAN without transferring full UE context and triggering the path switch procedure.

For example, RAN-CN signaling can be reduce without impact to the UE.

For example, the last serving NG-RAN can initiate UE context relocation to the new NG-RAN during small data transmission without the path switch procedure due to the AMF-triggered UE-associated signaling. Therefore, unnecessary NG signaling triggered by the AMF can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a gNodeB (gNB) adapted to operate in a wireless communication system, the method comprising:
   receiving a resume request message from a wireless device;
   transmitting a first Xn application protocol (XnAP) Retrieve UE Context Request message to a last serving gNB;
   receiving an XnAP Retrieve UE Context Response message from the last serving gNB in response to the first XnAP Retrieve UE Context Request message,
   wherein the XnAP Retrieve UE Context Response message includes i) an anchor kept indication, ii) uplink (UL) user plane (UP) transport network layer (TNL) information, and iii) a user equipment (UE) context,
   wherein the anchor kept indication indicates that the last serving gNB keeps the UE context and a UE-associated next-generation (NG) connection with the core network, and
   wherein the UL UP TNL information is used to set up a forwarding tunnel for UL data from the wireless device;
   transmitting downlink (DL) UP TNL information, which is used for forwarding of DL data from the last serving gNB, to the last serving gNB;
   transmitting a resume message to the wireless device based on the UE context, in response to the resume request message;
   skipping a path switch procedure towards the core network based on the anchor kept indication;
   receiving the DL data from a core network via the last serving gNB based on the DL UP TNL information;
   forwarding the DL data to the wireless device;
   deciding to transit the wireless device from a connected state to an inactive state; and
   transmitting a second XnAP UE Context Release Request message including an updated UE context to the last serving gNB.

2. The method of claim 1, further comprising:
   receiving the UL data from the wireless device; and
   forwarding the UL data towards the core network via the last serving gNB based on the UL UP TNL information.

3. The method of claim 1, further comprising, before transmitting the second XnAP UE Context Release Request message:
   generating a release message with a suspend configuration; and
   transmitting the release message with the suspend configuration to the wireless device.

4. The method of claim 1, further comprising:
   receiving an XnAP UE Context Release message including a release message with a suspend configuration from the last serving gNB, in response to the second XnAP UE Context Release Request message; and
   transmitting the release message with the suspend configuration to the wireless device.

5. The method of claim 1, wherein the wireless device is in communication with at least one of a mobile device, a network, and/or or autonomous vehicles other than the wireless device.

* * * * *